(12) United States Patent
Repasky et al.

(10) Patent No.: US 8,419,827 B2
(45) Date of Patent: Apr. 16, 2013

(54) STAGED MEMBRANE OXIDATION REACTOR SYSTEM

(75) Inventors: John Michael Repasky, Allentown, PA (US); Michael Francis Carolan, Allentown, PA (US); VanEric Edward Stein, Allentown, PA (US); Christopher Ming-Poh Chen, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/549,900

(22) Filed: Jul. 16, 2012

(65) Prior Publication Data

US 2013/0043432 A1  Feb. 21, 2013

Related U.S. Application Data

(62) Division of application No. 11/758,231, filed on Jun. 5, 2007, now Pat. No. 8,262,755.

(51) Int. Cl.
*B01D 53/22* (2006.01)
*B01J 47/12* (2006.01)
*B01J 47/14* (2006.01)

(52) U.S. Cl.
USPC .............................. 95/45; 48/127.9; 423/220

(58) Field of Classification Search .................. None
See application file for complete search history.

(56) References Cited

U.S. PATENT DOCUMENTS

| | | | |
|---|---|---|---|
| 4,620,940 A | 11/1986 | Quang et al. | |
| 5,269,822 A | 12/1993 | Carolan et al. | |
| 5,820,655 A | 10/1998 | Gottzmann et al. | |
| 5,837,125 A | 11/1998 | Prasad et al. | |
| 5,865,878 A | 2/1999 | Drnevich et al. | |
| 5,883,138 A | 3/1999 | Hershkowitz et al. | |
| 5,997,826 A | 12/1999 | Lodeng et al. | |
| 6,010,614 A | 1/2000 | Keskar et al. | |
| 6,048,472 A | 4/2000 | Nataraj et al. | |
| 6,106,591 A | 8/2000 | Keskar et al. | |
| 6,214,066 B1 | 4/2001 | Nataraj et al. | |

(Continued)

FOREIGN PATENT DOCUMENTS

| | | |
|---|---|---|
| EP | 0 155 867 A1 | 9/1985 |
| EP | 0 875 284 A1 | 11/1998 |

(Continued)

OTHER PUBLICATIONS

Fjellvag, H., et al., "Carbonatization of $YBa_2Cu_2O_{6+x}$", Acta Chemica Scandinavica; vol. A42; 1988; pp. 178-184; XP-002565598.

*Primary Examiner* — Melvin C Mayes
*Assistant Examiner* — Colin W Slifka
(74) *Attorney, Agent, or Firm* — Bryan C. Hoke, Jr.

(57) ABSTRACT

Ion transport membrane oxidation system comprising (a) two or more membrane oxidation stages, each stage comprising a reactant zone, an oxidant zone, one or more ion transport membranes separating the reactant zone from the oxidant zone, a reactant gas inlet region, a reactant gas outlet region, an oxidant gas inlet region, and an oxidant gas outlet region; (b) an interstage reactant gas flow path disposed between each pair of membrane oxidation stages and adapted to place the reactant gas outlet region of a first stage of the pair in flow communication with the reactant gas inlet region of a second stage of the pair; and (c) one or more reactant interstage feed gas lines, each line being in flow communication with any interstage reactant gas flow path or with the reactant zone of any membrane oxidation stage receiving interstage reactant gas.

8 Claims, 8 Drawing Sheets

U.S. PATENT DOCUMENTS

| | | |
|---|---|---|
| 6,402,988 B1 | 6/2002 | Gottzmann et al. |
| 6,403,041 B1 | 6/2002 | Takahashi et al. |
| 6,492,290 B1 | 12/2002 | Dyer et al. |
| 6,527,980 B1 | 3/2003 | Roden et al. |
| 6,695,983 B2 | 2/2004 | Prasad et al. |
| 7,122,072 B2 | 10/2006 | Carolan et al. |
| 7,153,695 B2 | 12/2006 | Roeraade et al. |
| 7,179,323 B2 | 2/2007 | Stein et al. |
| 7,195,742 B2 | 3/2007 | Liu et al. |
| 7,255,845 B2 | 8/2007 | Tonkovich et al. |
| 7,279,027 B2 | 10/2007 | Carolan et al. |
| 7,470,408 B2 | 12/2008 | Tonkovich et al. |
| 7,686,856 B2 | 3/2010 | Hemmings et al. |
| 7,807,860 B2 | 10/2010 | Colman et al. |
| 2002/0141917 A1 | 10/2002 | Komaki et al. |
| 2002/0155061 A1 | 10/2002 | Prasad et al. |
| 2003/0039601 A1 | 2/2003 | Halvorson et al. |
| 2003/0198592 A1 | 10/2003 | Allison et al. |
| 2004/0186018 A1 | 9/2004 | Carolan et al. |
| 2005/0031531 A1 | 2/2005 | Stein et al. |
| 2006/0180022 A1 | 8/2006 | Holmes et al. |
| 2007/0292342 A1 | 12/2007 | Hemmings et al. |
| 2008/0226517 A1 | 9/2008 | Vitucci et al. |
| 2008/0302013 A1 | 12/2008 | Repasky et al. |

FOREIGN PATENT DOCUMENTS

| | | |
|---|---|---|
| EP | 1 245 532 A2 | 10/2002 |
| EP | 1 504 811 A1 | 2/2005 |
| EP | 0875285 B1 | 3/2005 |
| EP | 1637215 A2 | 3/2006 |
| EP | 1775260 A2 | 4/2007 |
| JP | 4-267071 | 9/1992 |
| JP | 7-065846 | 3/1995 |
| JP | 10-314573 | 2/1998 |
| JP | 2002512586 A | 4/2002 |
| JP | 2003277009 A | 10/2003 |
| JP | 2003-327411 | 11/2003 |
| JP | 2004063341 | 2/2004 |
| JP | 2004522973 | 7/2004 |
| JP | 2005279895 A | 10/2005 |
| JP | 2005534156 A | 11/2005 |
| JP | 2006514878 A | 5/2006 |
| JP | 2006517956 A | 8/2006 |
| JP | 2007521944 A | 8/2007 |
| JP | 2008526501 A | 7/2008 |
| RU | 2 177 822 C2 | 1/2002 |
| WO | 02/16015 A1 | 2/2002 |
| WO | 03/080229 A1 | 10/2003 |

STAGED MEMBRANE OXIDATION REACTOR SYSTEM

CROSS-REFERENCE TO RELATED APPLICATIONS

This application is a divisional of U.S. patent application Ser. No. 11/758,231 titled "Staged Membrane Oxidation Reactor System," filed Jun. 5, 2007, now U.S. Pat. No. 8,262,755, the specification and claims which are incorporated by reference and made part of this application.

STATEMENT REGARDING FEDERALLY SPONSORED RESEARCH OR DEVELOPMENT

This invention was made with government support under Contract Number DE-FC26-97FT96052 between Air Products and Chemicals, Inc. and the U.S. Department of Energy. The Government has certain rights to this invention.

BACKGROUND

The permeation of oxygen ions through ceramic ion transport membranes is the basis for the design and operation of high-temperature oxidation reactor systems in which permeated oxygen is reacted with oxidizable compounds to form oxidized or partially-oxidized reaction products. The practical application of these oxidation reactor systems requires membrane assemblies having large surface areas, flow passages to contact oxidant feed gas with the oxidant sides of the membranes, flow passages to contact reactant feed gas with the reactant sides of the membranes, and flow passages to withdraw product gas from the permeate sides of the membranes. These membrane assemblies may comprise a large number of individual membranes arranged and assembled into modules having appropriate gas flow piping to introduce feed gases into the modules and withdraw product gas from the modules.

Ion transport membranes may be fabricated in either planar or tubular configurations. In the planar configuration, multiple flat ceramic plates are fabricated and assembled into stacks or modules having piping means to pass oxidant feed gas and reactant feed gas over the planar membranes and to withdraw product gas from the permeate side of the planar membranes. In tubular configurations, multiple ceramic tubes may be arranged in bayonet or shell-and-tube configurations with appropriate tube sheet assemblies to isolate the oxidant and reactant sides of the multiple tubes.

The individual membranes used in planar or tubular module configurations typically comprise very thin layers of active membrane material supported on material having large pores or channels that allow gas flow to and from the surfaces of the active membrane layers. The ceramic membrane material and the components of the membrane modules can be subjected to significant mechanical stresses during normal steady-state operation and especially during unsteady-state startup, shutdown, and upset conditions. These stresses may be caused by thermal expansion and contraction of the ceramic material and by dimensional variance caused by chemical composition or crystal structure changes due to changes in the oxygen stoichiometry of the membrane material. These modules may operate with significant pressure differentials across the membrane and membrane seals, and stresses caused by these pressure differentials must be taken into account in membrane module design. In addition, membrane modules have upper temperature limits above which membrane degradation and/or module damage may occur.

The relative importance of these phenomena may differ depending on the specific oxidation reactions and operating conditions used. The potential operating problems caused by these phenomena may have a significant negative impact on the conversion efficiency and membrane operating life of the system.

There is a need in the field of high temperature ceramic membrane reactors for new membrane module and reactor system designs that address and overcome these potential operating problems. Such designs should include features to allow long membrane life, minimum capital cost, and efficient operation over wide ranges of production rates. Embodiments of the invention disclosed and defined herein address these needs by providing improved module and reactor designs for use in membrane oxidation systems.

BRIEF SUMMARY

One embodiment of the invention relates to an ion transport membrane oxidation system comprising (a) two or more membrane oxidation stages, each stage comprising a reactant zone, an oxidant zone, one or more ion transport membranes separating the reactant zone from the oxidant zone, a reactant gas inlet region, a reactant gas outlet region, an oxidant gas inlet region, and an oxidant gas outlet region; (b) an interstage reactant gas flow path disposed between each pair of membrane oxidation stages, wherein the interstage reactant gas flow path is adapted to place the reactant gas outlet region of a first stage of the pair in flow communication with the reactant gas inlet region of a second stage of the pair such that interstage reactant gas can flow from the first stage to the second stage; and (c) one or more reactant interstage feed gas lines, each line being in flow communication with any interstage reactant gas flow path or with the reactant zone of any membrane oxidation stage receiving interstage reactant gas.

Another embodiment includes a method for generating an oxidation product gas comprising (a) providing an ion transport membrane oxidation system having (1) two or more membrane oxidation stages, each stage comprising a reactant zone, an oxidant zone, one or more ion transport membranes separating the reactant zone from the oxidant zone, a reactant gas inlet region, a reactant gas outlet region, an oxidant gas inlet region, and an oxidant gas outlet region; (2) an interstage reactant gas flow path disposed between each pair of membrane oxidation stages, wherein the interstage reactant gas flow path is adapted to place the reactant gas outlet region of a first stage of the pair in flow communication with the reactant gas inlet region of a second stage of the pair such that interstage reactant gas can flow from the first stage to the second stage; and (3) one or more reactant interstage feed gas lines, each line being in flow communication with any interstage reactant gas flow path or with the reactant zone of any membrane oxidation stage receiving interstage reactant gas. The method includes introducing one or more reactant feed gases into the reactant gas inlet region of a first stage of the two or more membrane oxidation stages; (c) introducing an oxidant gas into any of the oxidant gas inlet regions of the two or more membrane oxidation stages; (d) introducing a reactant interstage feed gas into any of the interstage reactant gas flow paths disposed between adjacent membrane oxidation stage or into any reactant zone of any stage receiving interstage reactant gas; and (e) withdrawing an oxidation gas product from the reactant gas outlet region of a last stage of the two or more membrane oxidation stages.

A related embodiment of the invention provides an ion transport membrane oxidation system comprising (a) two or more membrane oxidation stages, each stage comprising a reactant zone, an oxidant zone, one or more ion transport membranes separating the reactant zone from the oxidant zone, a reactant gas inlet region, a reactant gas outlet region, an oxidant gas inlet region, and an oxidant gas outlet region;

(b) an interstage reactant gas flow path disposed between each pair of membrane oxidation stages, wherein the interstage reactant gas flow path is adapted to place the reactant gas outlet region of a first stage of the pair in flow communication with the reactant gas inlet region of the second stage of the pair such that interstage reactant gas can flow from the first stage to the second stage;

(c) one or more reactant interstage feed gas lines, each line being in flow communication with any interstage reactant gas flow path or with the reactant zone of any membrane oxidation stage receiving interstage reactant gas;

(d) one or more reactant gas feed lines in flow communication with the reactant zone of a first stage of the two or more membrane oxidation stages;

(e) a reactant gas supply manifold in flow communication with one of the reactant gas feed lines to the first stage and in flow communication with any of the reactant interstage feed gas lines; and (f) a product withdrawal line adapted to withdraw an oxidation product from the reactant zone of the last stage of the two or more membrane oxidation stages.

Another related embodiment of the invention relates to a method for generating an oxidation product gas comprising (a) providing an ion transport membrane oxidation system that includes (1) two or more membrane oxidation stages, each stage comprising a reactant zone, an oxidant zone, one or more ion transport membranes separating the reactant zone from the oxidant zone, a reactant gas inlet region, a reactant gas outlet region, an oxidant gas inlet region, and an oxidant gas outlet region; (2) an interstage reactant gas flow path disposed between each pair of membrane oxidation stages, wherein the interstage reactant gas flow path is adapted to place the reactant gas outlet region of a first stage of the pair in flow communication with the reactant gas inlet region of a second stage of the pair such that interstage reactant gas can flow from the first stage to the second stage; (3) one or more reactant interstage feed gas lines, each line being in flow communication with any interstage reactant gas flow path or with the reactant zone of any membrane oxidation stage receiving interstage reactant gas; (4) one or more reactant gas feed lines in flow communication with the reactant zone of a first stage of the two or more membrane oxidation stages; (5) a reactant gas supply manifold in flow communication with one of the reactant gas feed lines to the first stage and in flow communication with any of the reactant interstage feed gas lines; and (6) a product withdrawal line adapted to withdraw an oxidation product from the reactant zone of the last stage of the two or more membrane oxidation stages.

This embodiment includes the steps of (b) providing a reactant gas via the reactant gas supply manifold, introducing reactant feed gas from the manifold into the reactant zone of the first stage, and introducing reactant gas from the manifold as reactant interstage feed gas into any of the one or more reactant interstage feed gas lines; (c) introducing an oxidant gas into any of the oxidant gas inlet regions of the two or more membrane oxidation stages; and (d) withdrawing an oxidation gas product from the reactant gas outlet region of the last stage of the two or more membrane oxidation stages.

A further embodiment of the invention includes an ion transport membrane oxidation system comprising (a) two or more membrane oxidation stages, each stage comprising a reactant zone, an oxidant zone, one or more ion transport membranes separating the reactant zone from the oxidant zone, a reactant gas inlet region, a reactant gas outlet region, an oxidant gas inlet region, and an oxidant gas outlet region; (b) an interstage reactant gas flow path disposed between each pair of membrane oxidation stages, wherein the interstage reactant gas flow path is adapted to place the reactant gas outlet region of a first stage of the pair in flow communication with the reactant gas inlet region of a second stage of the pair such that interstage reactant gas can flow from the first stage to the second stage; (c) one or more reactant interstage feed gas lines, each line being in flow communication with any interstage reactant gas flow path or with the reactant zone of any membrane oxidation stage receiving interstage reactant gas; (d) one or more reactant gas feed lines in flow communication with the reactant zone of a first stage of the two or more membrane oxidation stages; (e) a reactant interstage feed gas supply manifold in flow communication with any of the reactant interstage feed gas lines; and (f) a product withdrawal line adapted to withdraw an oxidation product from the reactant zone of the last stage of the two or more membrane oxidation stages.

A further related embodiment of the invention provides an ion transport membrane oxidation system comprising (a) two or more membrane oxidation stages, each stage comprising a reactant zone, an oxidant zone, one or more ion transport membranes separating the reactant zone from the oxidant zone, a reactant gas inlet region, a reactant gas outlet region, an oxidant gas inlet region, and an oxidant gas outlet region; (b) an interstage reactant gas flow path disposed between each pair of membrane oxidation stages, wherein the interstage reactant gas flow path is adapted to place the reactant gas outlet region of a first stage of the pair in flow communication with the reactant gas inlet region of a second stage of the pair such that interstage reactant gas can flow from the first stage to the second stage; (c) one or more reactant interstage feed gas lines, each line being in flow communication with any interstage reactant gas flow path or with the reactant zone of any membrane oxidation stage receiving interstage reactant gas.

This embodiment includes (d) one or more reactant gas feed lines in flow communication with the reactant zone of a first stage of the two or more membrane oxidation stages; (e) a reactant interstage feed gas supply manifold in flow communication with any of the reactant interstage feed gas lines; (f) a reactant gas supply manifold in flow communication with any of (1) any of the reactant interstage feed gas lines and (2) any of the one or more reactant gas feed lines; and (g) a product withdrawal line adapted to withdraw an oxidation product from the reactant zone of the last stage of the two or more membrane oxidation stages.

An optional embodiment of the invention relates to a method for generating an oxidation product gas comprising (a) providing an ion transport membrane oxidation system that includes (1) two or more membrane oxidation stages, each stage comprising a reactant zone, an oxidant zone, one or more ion transport membranes separating the reactant zone from the oxidant zone, a reactant gas inlet region, a reactant gas outlet region, an oxidant gas inlet region, and an oxidant gas outlet region; (2) an interstage reactant gas flow path disposed between each pair of membrane oxidation stages, wherein the interstage reactant gas flow path is adapted to place the reactant gas outlet region of a first stage of the pair in flow communication with the reactant gas inlet region of a second stage of the pair such that interstage reactant gas can flow from the first stage to the second stage; (3) one or more reactant interstage feed gas lines, each line being in flow communication with any interstage reactant gas flow path or with the reactant zone of any membrane oxidation stage receiving interstage reactant gas; (4) one or more reactant gas feed lines in flow communication with the reactant zone of a first stage of the two or more membrane oxidation stages; (5) a reactant interstage feed gas supply manifold in flow communication with any of the reactant interstage feed gas lines; and (6) a product withdrawal line adapted to withdraw an oxidation product from the reactant zone of the last stage of the two or more membrane oxidation stages.

This embodiment includes the steps of (b) introducing a reactant feed gas into the reactant zone of the first stage of the two or more membrane oxidation stages; (c) providing reactant interstage feed gas via the reactant interstage feed gas supply manifold into any of the one or more reactant interstage feed gas lines; (d) introducing an oxidant gas into any of the oxidant gas inlet regions of the two or more membrane oxidation stages; and (e) withdrawing an oxidation gas product from the reactant gas outlet region of the last stage of the two or more membrane oxidation stages.

Another embodiment provides a method for the operation of an ion transport membrane oxidation system comprising (a) introducing one or more reactant gases into a reactant zone of the ion transport membrane oxidation system, wherein the one or more reactant gases comprise at least methane and carbon dioxide; (b) introducing an oxygen-containing gas into an oxidant zone of the ion transport membrane oxidation system; (c) permeating oxygen from the oxidant zone through an ion transport membrane into the reactant zone and reacting the oxygen therein with one or more components in the reactant gases; and (d) maintaining the partial pressure of carbon dioxide in the reactant gas flowing into the reactant zone to be less than a critical threshold carbon dioxide partial pressure, $p_{CO2}^*$, wherein $p_{CO2}^*$ is defined as a carbon dioxide partial pressure above which the material in the ion transport membrane reacts with carbon dioxide and decomposes.

DETAILED DESCRIPTION

Figure 1:
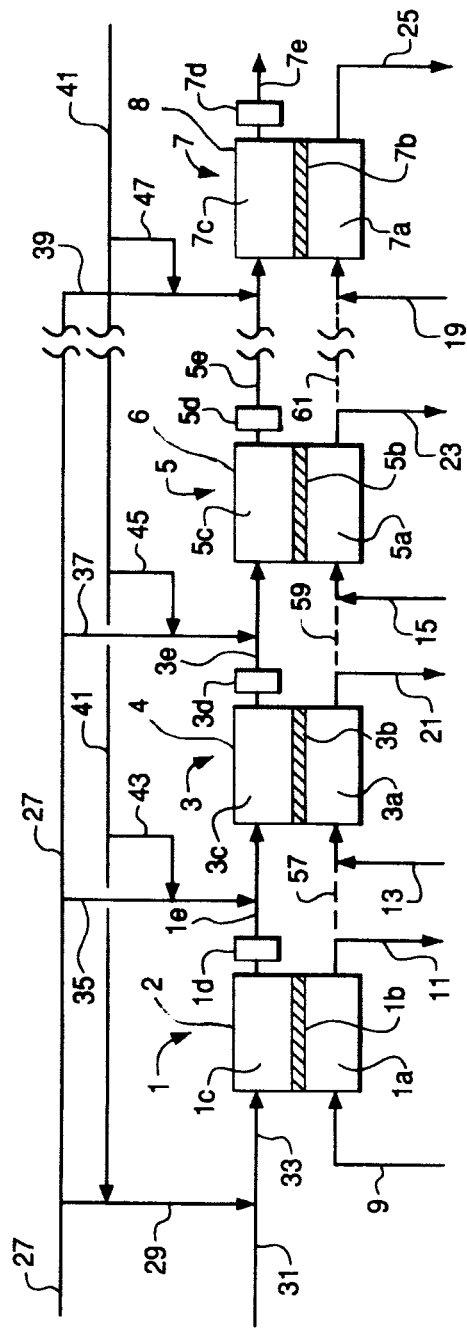
FIG. 1 is a schematic flow diagram of a generic embodiment of the present invention.

Membrane oxidation reactor systems typically utilize partial oxidation, complete oxidation, steam reforming, carbon dioxide reforming, water-gas shift, and/or various combinations of these reactions to produce synthesis gas. Certain of these reactions are strongly exothermic and others are endothermic. Because ceramic membrane systems generally require a narrow operating temperature range, proper control of the exothermic and endothermic reactions is required. This need is addressed by embodiments of the present invention directed toward the design and operation of ion transport membrane (ITM) systems that utilize multiple reactant-staged membrane modules operating in series for use in oxidation processes. It has been found that when exothermic reactions occur between permeated oxygen and reactive components, for example in the production of synthesis gas from methane, the degree of reactant conversion across an individual membrane must be limited to prevent an excessive temperature gradient across the membrane. It also has been found that when a membrane is transporting oxygen, the amount of oxygen extraction across an individual membrane must be limited to prevent an excessive oxygen vacancy gradient in the membrane material between the leading edge and trailing edge of the membrane. Excessive temperature or oxygen vacancy gradients may cause excessive stresses in the membranes that could seriously limit the membrane life. In addition, it has been found that the concentration of certain components in the reactant gas, particularly carbon dioxide, must be maintained below certain critical partial pressures to avoid damage to the membrane material.

The embodiments of the present invention address these problems by utilizing multiple reactor stages so that the reactant conversion in each stage can be controlled, the amount of oxygen extracted across membranes in each module can be kept sufficiently low to prevent an excessive oxygen vacancy gradient in the membrane material, and the partial pressure of carbon dioxide in contact with the membranes can be maintained below a critical partial pressure. A reactor stage may comprise multiple membrane modules arranged in parallel and/or series. The amount of oxygen extracted across each individual module may be limited by appropriate module sizing, and the total desired degree of oxygen extraction within a stage may be achieved by operating a selected plurality of modules within a stage.

The total desired conversion in the system may be achieved by utilizing a plurality of reactor stages in series wherein each stage is operated so that the degree of reactant conversion in each stage is controlled at a selected value and may approach chemical equilibrium. This may be accomplished by introducing portions of the reactant gas into two or more stages of a multiple-stage reactor system wherein each stage may comprise multiple membrane modules arranged in series and/or parallel. The degree of reactant conversion across each individual module in a stage may be controlled by appropriate module sizing and/or feed gas flow rate. Recycle gas from downstream synthesis gas conversion processes or reactant gas from other sources may be introduced into the membrane reactor system as additional reactant gas to increase overall conversion and/or to control temperatures in selected stages. This recycle gas often contains carbon dioxide, and the partial pressure of this carbon dioxide at any point in the reactor may be controlled to prevent membrane degradation as described in detail below.

The following definitions apply to terms used in the description and claims for the embodiments of the invention presented herein.

An ion transport membrane module is an assembly of a plurality of ion transport membrane structures that has a gas inflow region and a gas outflow region disposed such that gas can flow across the external surfaces of the membrane structures. The plurality of ion transport membrane structures also may have a gas inflow region and a gas outflow region disposed such that gas can flow across the internal surfaces of the membrane structures. Gas flowing from the inflow region to the outflow region of a membrane module may change in composition as it passes across the surfaces of the membrane structures in the module. Each membrane structure has an oxidant gas feed side or zone, also described as the oxidant or cathode side, and a reactant, permeate, or anode side or zone separated by an active membrane layer or region that allows oxygen ions to permeate through the membrane and react with reactive components on the reactant side. In one exemplary type of membrane module design, each module has an interior region and an exterior region wherein the oxidant gas feed flows through the interior region and the reactant gas flows through the exterior region of the membrane structure.

An ion transport membrane comprises an active layer of ceramic membrane material comprising mixed metal oxides capable of transporting or permeating oxygen ions at elevated temperatures. The ion transport membrane also may transport electrons in addition to oxygen ions, and this type of ion transport membrane typically is described as a mixed conductor membrane. The ion transport membrane also may be a composite membrane comprising a layer of dense active membrane material and one or more layers of porous or channeled support layers.

The terms "stage", "reaction stage", and "reactor stage" in a multi-stage membrane oxidation system are equivalent and are defined as an assembly of one or more membrane modules arranged in parallel and/or series within the stage wherein each stage comprises (1) a reactant side or zone (these terms are equivalent), (2) an oxidant side or zone, (3) one or more ion transport membranes separating the oxidant zone from the reactant zone, (4) a reactant gas inlet or inlet region in flow communication with the reactant zone, and (5) a reactant gas outlet or outlet region in flow communication with the reactant zone. More specifically, each stage may have a reactant feed gas inlet or inlet region (if it is the first stage), an interstage reactant gas stream inlet or inlet region (if it is not the first stage), an interstage reactant gas stream outlet or outlet region (if it is not the last stage), and a product gas outlet or outlet region (if it is the last stage). Each stage also has one or more oxidant gas inlets or inlet regions in flow communication with the oxidant zone and one or more oxygen-depleted oxidant gas outlets or outlet regions in flow communication with the oxidant zone.

The one or more ion transport membranes separating the oxidant zone from the reactant zone allow the permeation of oxygen ions through the membrane, and the dense active membrane material does not allow any substantial bulk flow of gas between the oxidant and reactant zones of the stage. Small but acceptable leaks in the membrane may occur in some cases.

A stage may have any number of individual membrane modules arranged in series and/or parallel flow arrangement with respect to the reactant gas streams. Reactant gas is introduced into the stage inlet, is distributed among the modules in the stage, and passes through the reactant sides of the modules. The effluent gas from the modules is withdrawn via the stage outlet. A stage may include one or more catalysts to enhance the reactions occurring therein; catalysts may include any of oxidation catalyst, steam reforming catalyst, carbon dioxide reforming catalyst, and water gas shift catalyst. Catalyst may be disposed (1) following the reactant zone of any stage and/or (2) downstream of any membrane module within any stage and/or (3) upstream of any membrane module within any stage and/or (4) within or between the modules within any stage in any desired configuration.

A reactant gas is defined as a gas comprising one or more reactive components that participate in any of the reactions (1) that occur in the reactant zone of a membrane oxidation reactor stage and (2) that may occur in a catalyst region following or preceding the reactant zone of the membrane oxidation reactor stage. The reactions in the reactant zone may occur (1) between oxygen permeated through the membrane and any of the reactive components and (2) among any of the reactive components. These reactions form reaction products that may be withdrawn as outlet or product gas from any stage of a staged reactor system.

The term "hydrocarbon" is defined as a compound comprising at least hydrogen and carbon atoms. The term "oxygenated hydrocarbon" is defined as a compound comprising at least hydrogen, carbon, and oxygen atoms.

The term "pre-reformed natural gas" means the reaction products from the catalytic reforming of a portion of the hydrocarbons in a natural gas stream. Pre-reformed natural gas typically comprises methane, carbon monoxide, carbon dioxide, hydrogen, and water. Pre-reforming of natural gas may be carried out to convert and decompose hydrocarbons heavier than methane for the purpose of eliminating coking in downstream reforming or partial oxidation processes. The terms "pre-reforming" and "pre-reformed" mean the partial reforming of a hydrocarbon-containing stream prior to further reaction in a membrane reactor system. The terms "pre-reforming" or "pre-reformed" also may be defined as the catalytic reaction of water and/or carbon dioxide with a portion of the hydrocarbons in a hydrocarbon-containing stream, particularly hydrocarbons heavier than methane, to form reformed products.

In one embodiment of the invention, a staged reactor system is operated to generate a synthesis gas product comprising hydrogen and carbon monoxide. This embodiment utilizes a first reactant gas comprising one or more hydrocarbons and a second reactant gas comprising steam (vaporized water). A typical first reactant gas is natural gas comprising mostly methane and smaller concentrations of hydrocarbons having 2 to 6 carbon atoms; another typical first reactant gas is methane-rich gas resulting from pre-reforming natural gas with steam; other carbonaceous reactant gases may be used in alternative applications. Optionally, a third reactant gas may be used that comprises one or more components selected from the group consisting of oxygen, nitrogen, hydrogen, water, methane, other hydrocarbons, carbon monoxide, and carbon dioxide. The third reactant gas may be provided, for example, by offgas from a downstream process that uses the synthesis gas product as feed gas. When three reactant gases are used in this embodiment, the chief reactive components are any of methane, other hydrocarbons, water, hydrogen, carbon monoxide, and carbon dioxide.

An oxidant gas is defined as a gas comprising oxygen and other components from which oxygen can be extracted by permeation through an ion transport membrane to react with reactive components in the reactant zone. An oxygen-containing gas is a type of reactant gas that comprises one or more compounds that contain oxygen atoms such as, for example, water, carbon monoxide, and carbon dioxide.

A reactant feed gas is defined as a reactant gas introduced into the reactant zone or side of the first stage of a multi-stage membrane reactor system. An interstage reactant gas is defined as reactant gas flowing between stages, i.e., from the outlet region of the reactant zone of one stage and into the inlet region of the reactant zone of the next stage; this gas comprises reaction products and may include unreacted reactive components. The relative amounts of reactive components and oxidation products in an interstage reactant gas stream entering a given stage may depend on (1) the degree to which chemical equilibrium is approached in the previous stage and (2) the amount and composition of reactant interstage feed gas (if any) that is introduced into the interstage reactant gas to the reaction zone of the given stage.

A reactant interstage feed gas is defined as a reactant gas that is (1) introduced into the reactant zone of any stage other than the first stage or (2) mixed with an interstage reactant gas prior to entering that reactant zone. The reactant interstage feed gas may have the same composition as the reactant feed gas to the first stage or may have a different composition than the reactant feed gas. A reactant feed gas or reactant interstage feed gas typically comprises high concentrations of reactive components. A product gas is the reactant gas effluent from the reactant zone of the last stage of a multi-stage membrane reactor system, wherein the product gas comprises one or more oxidation products and also may comprise unreacted reactive components. The product gas may be, for example, synthesis gas containing at least hydrogen and carbon oxides.

A reactant-staged membrane reactor system is defined as a system comprising two or more membrane stages arranged in series with respect to the flow of reactant gases through the system wherein the reactant gas effluent flows from the outlet region of one stage into the inlet region of another stage immediately downsteam. Reactant feed gas enters the first stage, product gas is withdrawn from the last stage, and an interstage reactant gas stream flows between each pair of series stages. A reactant interstage feed gas comprising additional reactant gas may be introduced into at least one interstage reactant gas stream and may be introduced into any of the interstage reactant gas streams in the multi-stage reactor system.

A membrane module may have a configuration of multiple planar wafers in which each wafer has a center or interior region and an exterior region, wherein the wafer is formed by two parallel planar members sealed about at least a portion of the peripheral edges thereof. Oxygen ions permeate through active membrane material that may be placed on either or both surfaces of a planar wafer. Gas can flow through the center or interior region of the wafer, and the wafer has one or more gas flow openings to allow gas to enter and/or exit the interior region of the wafer. Thus oxygen ions may permeate from the exterior region into the interior region, or conversely may permeate from the interior region to the exterior region. In one embodiment, the gas in contact with the outer surfaces in the exterior regions of the membrane modules may be at a higher pressure than the gas within the interior regions of the membrane modules. Representative membrane compositions and planar membrane module configurations that may be used in the embodiments of the present invention are described in U.S. Pat. No. 7,179,323 and U.S. Patent Publication 2004/0186018(A1), which are incorporated herein by reference.

Alternatively, the membrane module may have a tubular configuration in which an oxidant gas flows in contact with one side of the tube (i.e., in either the interior region or the exterior region of the tube) and oxygen ions permeate through active membrane material in or on the tube walls to the other side of the tube. The oxidant gas may flow inside or outside of the tube in a direction generally parallel to the tube axis, or conversely may flow over the outer side of the tube in a direction which is not parallel to the tube axis. A module may comprise multiple tubes arranged in bayonet or shell-and-tube configurations with appropriate tube sheet assemblies to isolate the oxidant and reactant sides of the multiple tubes.

Modules may be arranged in series within a reactor stage wherein a number of modules are disposed along a single axis. Typically, reactant gas which has passed across the surfaces of the membrane structures in a first module flows from the outflow region of that module, after which some or all of this gas enters the inflow region of a second module and thereafter flows across the surfaces of the membrane structures in the second module. The axis of a series of single modules may be parallel or nearly parallel to the overall flow direction or axis of the gas passing over the modules in series.

Modules may be arranged within a stage in banks of two or more parallel modules wherein a bank of parallel modules lies on an axis that is not parallel to, and may be generally orthogonal to, the overall flow direction or axis of the gas passing over the modules. Multiple banks of modules may be arranged in series, which means by definition that banks of modules are disposed such that at least a portion of reactant gas which has passed across the surfaces of the membrane structures in a first bank of modules flows across the surfaces of the membrane structures in a second bank of modules.

Any number of single modules or banks of modules may be arranged in series and/or parallel within a stage. In one embodiment, the modules in a series of single modules or in a series of banks of modules may lie on a common axis or common axes in which the number of axes equals one or equals the number of modules in each bank. In another embodiment, successive modules or banks of modules in a series of modules or banks of modules may be offset in an alternating fashion such that the modules lie on at least two axes or on a number of axes greater than the number of modules in a bank, respectively. Both of these embodiments are included in the definition of modules in series as used herein.

The term "in flow communication with" as applied to a first and second region means that fluid can flow from the first region to the second region, through an intermediate region. The intermediate region may comprise connecting piping between the first and second regions or may comprise an open flow area or channel between the first and second regions. The term "connected to" as applied to a first and second region means that fluid can flow from the first region directly to the second region or through connecting piping to the second region. The term "direct flow communication" and the term "directly" as applied to a flowing fluid mean that the fluid can flow from a first region to a second region, and/or from the second region to the first region, wherein the flow path between the regions is not in flow communication with any vessel, storage tank, or process equipment, except that the fluid flow path may include piping and/or one or more flow control devices selected from orifices, valves, and other flow restriction devices.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

A schematic flow diagram of a generic embodiment of the invention is illustrated in FIG. 1. The exemplary membrane oxidation system comprises first stage 1, second stage 3, third stage 5, and last or $n^{th}$ stage 7. Any desired number of stages may be used as long as there are at least two stages. Each stage is illustrated schematically as a generic module having an oxygen permeable membrane that divides the module into an oxidant side and a permeate or reactant side. As explained above, a stage can comprise any number of membrane modules arranged in series and/or parallel and may include one or more catalysts.

First stage 1 comprises oxidant side or zone 1a, membrane 1b, reactant side or zone 1c, optional catalyst 1d, and appropriate gas inlet and outlet regions. Optional catalyst 1d is shown here as immediately following the module. Alternatively or additionally catalyst may be disposed immediately preceding the module (not shown) or within or around the module in any desired configuration (not shown). Similarly, second stage 3 comprises oxidant side 3a, membrane 3b, reactant side 3c, appropriate gas inlet and outlet regions, and optional catalyst 3d, which is shown here as immediately following the module. Alternatively or additionally, catalyst may be disposed immediately preceding the module (not shown) or within or around the module in any desired configuration (not shown). Similarly, third stage 5 comprises oxidant side 5a, membrane 5b, reactant side 5c, appropriate gas inlet and outlet regions, and optional catalyst 5d. Optional catalyst 5d is shown here as immediately following the module. Alternatively or additionally catalyst may be disposed immediately preceding the module (not shown) or within or around the module in any desired configuration (not shown). Last or $n^{th}$ stage 7 comprises oxidant side 7a, membrane 7b, reactant side 7c, appropriate gas inlet and outlet regions, and optional catalyst 7d, shown here as immediately following the module. Alternatively or additionally, catalyst may be disposed immediately preceding the module (not shown) or within or around the module in any desired configuration (not shown). Product gas from last stage 7 is withdrawn via product line 7e.

In the illustration of FIG. 1, interstage reactant gas flows from stage 1 via flow path 1e, from stage 3 via flow path 3e, and from stage 5 via flow path 5e. In one embodiment, each of stages 1, 3, and 5 may be enclosed in a separate pressure vessel 2, 4, 6, 8; in this case, flow paths 1e, 3e, and 5e are pipes, conduits, or closed channels between the vessels. In another embodiment, stages 1, 3, 5, and 7 may be enclosed in a single pressure vessel (not shown) such that reactant gas can flow through the reactant zones of each stage in succession; in this case, flow paths 1e, 3e, and 5e are open regions between stages through which gas can flow from the reactant gas outlet region of one stage into the reactant gas inlet region of the following stage. Each stage is adjacent a downstream stage and/or an upstream stage; the first stage is adjacent a downstream stage, the last stage is adjacent an upstream stage, and all other stages are adjacent an upstream stage and a downstream stage. The terms "upstream" and "downstream" are defined relative to the flow direction of reactant gas.

The oxidant zone and the reactant zone in each stage are isolated from each other so that the bulk flow of oxidant gas through the oxidant zone and the bulk flow of reactant gas through the reactant zone are separate and independent. The membrane or membranes separating the oxidant zone from the reactant zone prevents any substantial bulk gas flow between the zones and allows the permeation of oxygen through the membrane from the oxidant zone to the reactant zone. In some cases, small but acceptable leaks may occur through imperfections in the membrane.

An oxidant gas, for example, preheated air or oxygen-containing combustion products from a combustor operated with excess air, is introduced via oxidant inlet line 9 into oxidant side 1a of first stage 1 and contacts the oxidant side of membrane 1b, a portion of the oxygen permeates through membrane 1b, and oxygen-depleted gas exits first stage 1 via oxygen-depleted oxidant outlet line 11. Similarly, additional oxidant gas streams may be introduced via lines 13, 15, and 19 into stages 3, 5, and 7, respectively, and oxygen-depleted gas may exit the stages via lines 21, 23, and 25, respectively. Alternatively, some or all of the oxidant gas may flow through two or more stages in series via lines 57, 59, and 61. In one embodiment, for example, oxidant gas may flow through lines 9, 57, and 21 such that stages 1 and 3 operate in series with respect to oxidant gas; similarly, a single oxidant stream may provide oxidant to a pair of downstream stages. Thus the stages may be operated individually with respect to the flow of oxidant gas, may be operated in series with respect to the flow of oxidant gas, or may utilize any combination of individual and series operation with respect to the flow of oxidant gas. Oxidant gas inlet and outlet manifolds (not shown) may be used to introduce oxidant gas into the oxidant zones of the multiple stages and withdraw oxygen-depleted oxidant gas from the oxidant zones of the multiple stages.

Other oxidant gas flow configurations are possible as alternatives to that described above. For example, the oxidant gas may flow counter-current to the reactive gas flow, cross-flow to the reactive gas flow, or in any other arrangement such that sufficient oxidant gas is provided to the oxidant zone side of the membranes.

Reactant gas may enter the multi-stage reactor system via manifold 27, a first portion may be withdrawn via line 29 and combined with another reactant gas (for example, steam) provided in line 31, and the combined gas may be introduced via reactant gas inlet line 33 into reactant side 1c of first stage 1. Additional portions of reactant gas may be withdrawn from manifold 27 via any of reactant interstage feed gas lines 35, 37, and 39 and introduced as reactant interstage feed gas into any of interstage reactant gas flow paths 1e, 3e, and 5e, respectively. Alternatively, the reactant interstage feed gas may be introduced directly into the reactant side of any stage and/or upstream of any of the catalysts 1d, 3d, 5d, and 7d. The reactant gas in manifold 27 may comprise one or more hydrocarbons and also may comprise any of the components water, carbon monoxide, carbon dioxide, and hydrogen. For example, the reactant gas in manifold 27 may be pre-reformed natural gas comprising methane, carbon monoxide, carbon dioxide, hydrogen, and water. The reactant gas provided via line 31 may be, for example, vaporized water (steam).

Additional reactant gas may be provided via manifold 41 from a source different than the source of the reactant gas in line 27 and the source of reactant gas provided via line 31. This additional reactant gas may be introduced via any of lines 29, 43, 45, and 47 into any of first stage 1, the interstage reactant gas in line 1e, the interstage reactant gas in line 3e, and the interstage gas entering last or $n^{th}$ stage 7. Alternatively, the additional reactant gas may be introduced upstream of any of catalysts 1d, 3d, 5d, and 7d. This additional reactant gas may be, for example, an oxygen-containing gas comprising carbon dioxide obtained from a downstream process that uses product gas from line 7e. The additional reactant gas may comprise unreacted offgas from a downstream process that uses product gas from line 7e and/or may comprise partially-reformed unreacted offgas from a downstream process that uses product gas from line 7e. Any number of additional stages may be utilized between stage 5 and last stage 7 as desired.

The gas flow rates in any of the lines described above may be regulated by control valves or other flow devices (not shown) known in the art. Alternatively or additionally, the temperatures of any of the gas streams may be controlled by heating and/or cooling (not shown) by methods known in the art.

Various combinations of reactant gas types including oxygen-containing gas may be introduced into the reactant sides of the modules in the staged membrane oxidation reactor system of FIG. 1. In one embodiment, for example, pre-reformed natural gas may be introduced into the reactor stages via manifold 27 and lines 29, 35, 37, and 39, and steam may be introduced via lines 31 and 33 into first stage 1. No additional reactant gas is provided via manifold 41 and lines 29, 43, 45, and 47 in this embodiment. In another exemplary embodiment, pre-reformed natural gas and steam may be introduced into the first stage via lines 31 and 33, and carbon dioxide-containing gas (for example, a recycle gas from a downstream process) may be introduced into the system via manifold 41 and any of lines 43, 45, and 47. The downstream process may be a hydrocarbon synthesis process (e.g., a Fischer-Tropsch process) or an oxygenated hydrocarbon synthesis process (e.g., an alcohol synthesis process). The downstream process may utilize synthesis gas produced by the staged oxidation reactor system of FIG. 1. Manifold 27 and lines 29, 35, 37, and 39 are not used in this embodiment. Other embodiments are possible in which combinations of reactant gas from different sources are introduced into the reactor stages. For example, pre-reformed natural gas may be provided to the staged reactor system via manifold 27 and lines 29, 35, 37, and 39, steam may be introduced into the system via line 31, and carbon dioxide-containing gas (for example, a recycle gas from a downstream process) may be introduced into the system via manifold 41 and any of lines 43, 45, and 47. In another example, a reactant gas comprising pre-reformed natural gas, a carbon dioxide-containing additional reactant gas, and steam are provided to the staged reactor system via manifold 27 and lines 29, 35, 37, and 39, and steam may be introduced into the system via line 31. Manifold 41 and lines 43, 45, and 47 are not used in this case.

Figure 2:
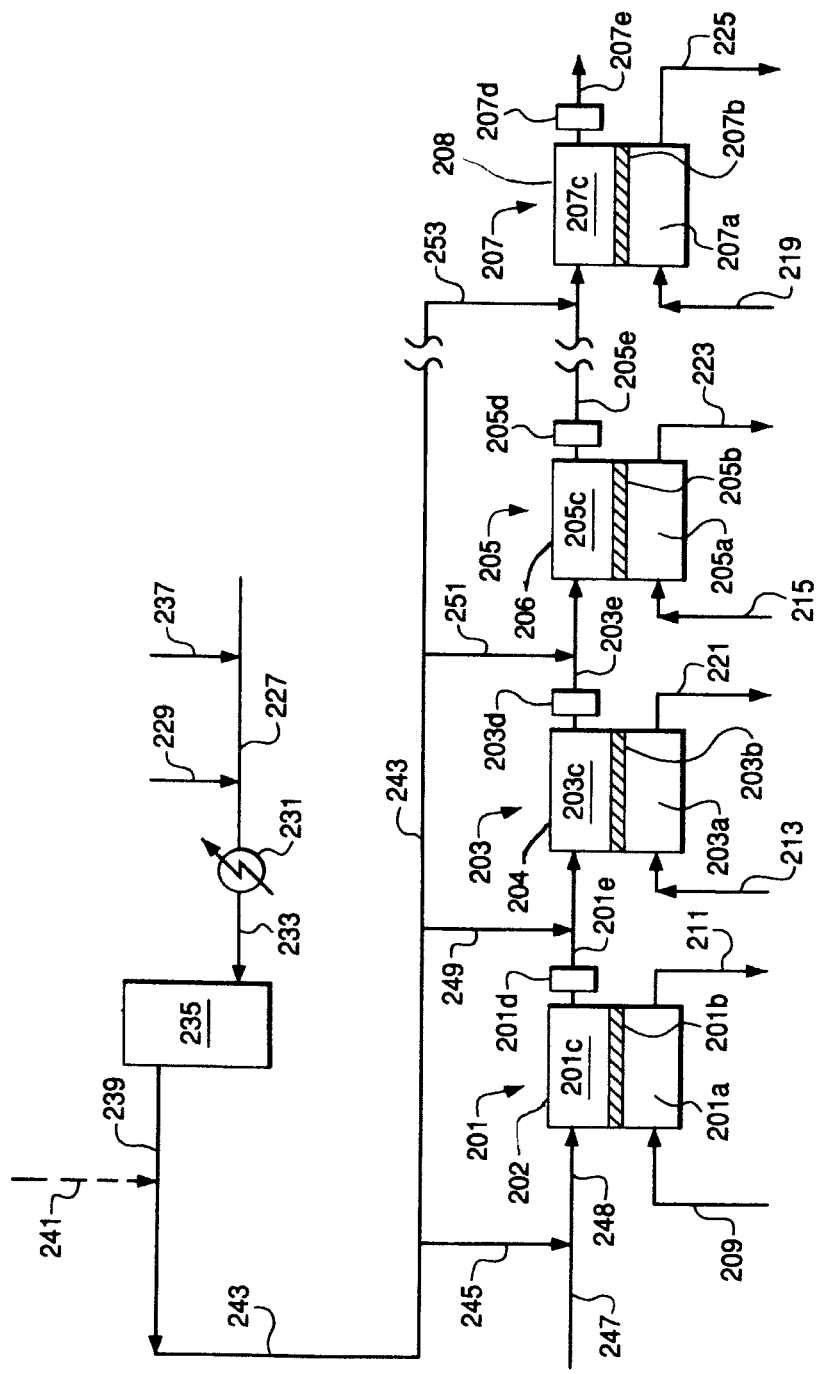
FIG. 2 is a schematic flow diagram of an embodiment of the invention.

Another embodiment of the invention is illustrated in the schematic flowsheet of FIG. 2 wherein a membrane oxidation system comprises first stage 201, second stage 203, third stage 205, and last or $n^{th}$ stage 207. Any number of stages may be used as long as there are at least two stages. Each stage is illustrated schematically as a generic module having an oxygen permeable membrane that divides the module into an oxidant side or zone and a permeate or reactant side or zone. As explained above, a stage can comprise any number of membrane modules arranged in series and/or parallel and may include one or more catalysts selected from oxidation catalyst, steam reforming catalyst, carbon dioxide reforming catalyst, and water gas shift catalyst.

First stage 201 comprises oxidant side 201a, membrane 201b, reactant side 201c, optional catalyst 201d, and appropriate gas inlet and outlet regions. Optional catalyst 201d is shown here as immediately following the module, but alternatively or additionally catalyst may be disposed immediately preceding the module (not shown) or within or around the module in any desired configuration (not shown). Similarly, second stage 203 comprises oxidant side 203a, membrane 203b, reactant side 203c, appropriate gas inlet and outlet regions, and optional catalyst 203d, which is shown here as immediately following the module. Alternatively or additionally, catalyst may be disposed immediately preceding the module (not shown) or within or around the module in any desired configuration (not shown). Similarly, third stage 205 comprises oxidant side 205a, membrane 205b, reactant side 205c, appropriate gas inlet and outlet regions, and optional catalyst 205d. Optional catalyst 205d is shown here as immediately following the module, but alternatively or additionally catalyst may be disposed immediately preceding the module (not shown) or within or around the module in any desired configuration (not shown). Last or $n^{th}$ stage 207 comprises oxidant side 207a, membrane 207b, reactant side 207c, appropriate gas inlet and outlet regions, and optional catalyst 207d, shown here as immediately following the module. Alternatively or additionally, catalyst may be disposed immediately preceding the module (not shown) or within or around the module in any desired configuration (not shown). Product gas from last stage 207 is withdrawn via product line 207e. Interstage reactant gas flows from stage 201 via line 201e, from stage 203 via line 203e, and from stage 205 via line 205e.

An oxidant gas, for example, preheated air or oxygen-containing combustion products from a combustor operated with excess air, is introduced via line 209 into oxidant side 201a of first stage 201 and contacts the oxidant side of membrane 201b, a portion of the oxygen permeates through membrane 201b, and oxygen-depleted gas exits first stage 201 via line 211. Similarly, additional oxidant gas streams may be introduced via lines 213, 215, and 219 into stages 203, 205, and 207, respectively, and oxygen-depleted gas may exit the stages via lines 221, 223, and 225, respectively.

Natural gas is provided as a reactant gas via line 227, is mixed with steam from line 229, the mixture is heated in pre-heater 231, and the heated mixture flows via line 233 to steam-methane reformer 235. Hydrogen may be added via line 237 for use within the reformer for feed gas desulfurization (not shown) as is normally practiced in the steam-methane reforming art. Partially-reformed or pre-reformed gas exits the reformer via line 239 and optionally is mixed with reactant gas in line 241 (for example, a recycle gas from a downstream process) to form a reactant feed gas flowing through manifold 243. The downstream process may be a hydrocarbon synthesis process (e.g., a Fischer-Tropsch process) or an oxygenated hydrocarbon synthesis process (e.g., an alcohol synthesis process). The downstream process may utilize synthesis gas produced by the staged oxidation reactor system of FIG. 2. Reactant feed gas may be at a temperature of 600 to 1150° C. and a pressure of 2 to 40 atma, and the gas typically comprises methane, water, hydrogen, carbon dioxide, and carbon monoxide.

A first portion of the reactant gas feed via line 245 is mixed with steam provided in line 247 and the mixed reactant feed gas flows into reactant side 201c of first stage 201, reacts therein with oxygen permeated through membrane 201b, passes through optional catalyst 201d, and flows via flow path 201e as an interstage reactant gas. A second portion of the reactant gas feed from manifold 243 is withdrawn via line 249 to provide a reactant interstage feed gas that is mixed with the interstage reactant gas in flow path 201e. The mixed gas then flows into reactant side 203c of second stage 203, reacts therein with oxygen permeated through membrane 203b, passes through optional catalyst 203d, and flows via flow path 203e as an interstage reactant gas. Alternatively, the reactant interstage feed gas in line 249 may be introduced directly into the reactant side or zone of stage 203 and/or upstream of catalyst 201d.

A third portion of the reactant gas feed from manifold 243 is withdrawn via line 251 to provide a reactant interstage feed gas that is mixed with the interstage reactant gas in flow path 203e. The mixed gas then flows into reactant side 205c of third stage 205, reacts therein with oxygen permeated through membrane 205b, passes through optional catalyst 205d, and flows via flow path 205e as an interstage reactant gas. Alternatively, the reactant interstage feed gas in line 251 may be introduced directly into the reactant side of stage 205 and/or upstream of catalyst 203*d*.

A fourth or $n^{th}$ portion of the reactant gas feed from manifold 243 is withdrawn via line 253 to provide a reactant interstage feed gas that is mixed with the interstage reactant gas in flow path 205*e*. The mixed gas then flows into reactant side 207*c* of last or $n^{th}$ stage 207, reacts therein with oxygen permeated through membrane 207*b*, passes through optional catalyst 207*d*, and flows via line 207*e* as a product synthesis gas. Alternatively, the reactant interstage feed gas in line 253 may be introduced directly into the reactant side of stage 207 and/or upstream of catalyst 205*d*.

The product gas may be at a temperature of 600 to 1150° C. and a pressure of 2 to 40 atma, and the gas may typically comprise hydrogen, carbon monoxide, water, carbon dioxide, and methane. Any number of additional stages may be utilized between third stage 205 and last stage 207 as desired.

In the illustration of FIG. 2 described above, interstage reactant gas flows from stage 201 via flow path 201*e*, from stage 203 via flow path 203*e*, and from stage 205 via flow path 205*e*. In one embodiment, each of stages 201, 203, 205, and 207 may be enclosed in a separate pressure vessel 202, 204, 206, and 208; in this case, flow paths 201*e*, 203*e*, and 205*e* are pipes, conduits, or closed channels between the vessels. In another embodiment, stages 201, 203, 205, and 207 may be enclosed in a single pressure vessel (not shown) such that reactant gas can flow through the reactant zones of each stage in succession; in this case, flow paths 201*e*, 203*e*, and 205*e* are open regions between stages through which gas can flow from the reactant gas outlet region of one stage into the reactant gas inlet region of the following stage.

Figure 3:
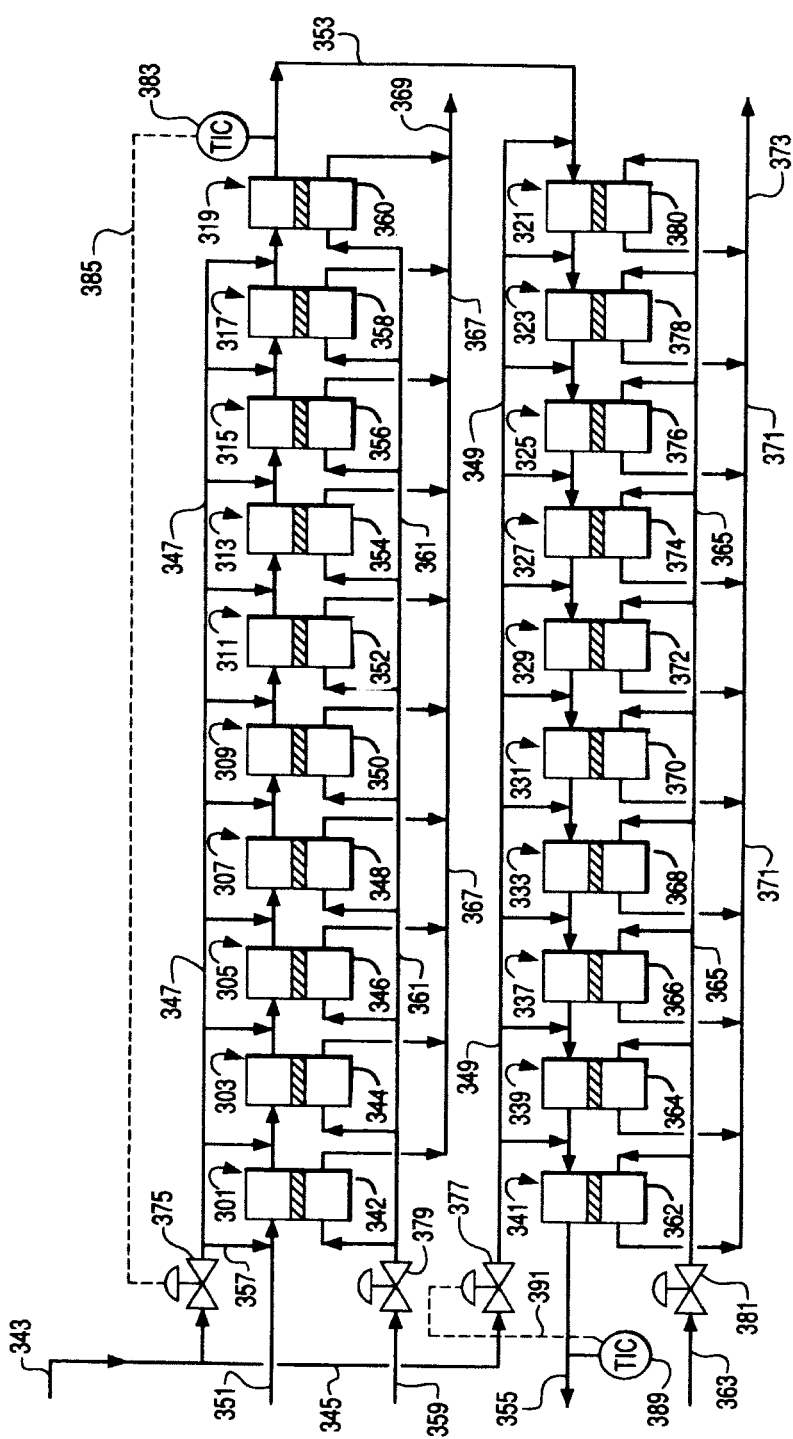
FIG. 3 is a schematic flow diagram for a specific configuration of the embodiment of FIG. 2.

A selected embodiment of the system of FIG. 2 is illustrated in FIG. 3. In this exemplary embodiment, twenty reactor stages are used and are arranged for control purposes into two groups of ten stages each such that stages 301 through 319 are in a first group and stages 321 through 341 are in a second group. Pre-reformed natural gas is introduced as a reactant feed gas via line 343 and is analogous to the reactant feed gas in line 243 as described above with reference to FIG. 2. The reactant feed gas flows via primary manifold 345 and is split to flow through secondary manifolds 347 and 349. Steam is fed into first stage 301 via line 351.

The reactant feed gas flows through the reactant side of first stage 301, and interstage reactant gas flows between successive stages through stage 319 as described above with reference to FIG. 2. Interstage reactant gas from the first group of stages 301-319 flows via line 353 and then flows through the reactant sides of the successive stages in the second group of stages 321-341. Synthesis gas product flows from the system via line 355. In one embodiment, each of stages 301-341 may be enclosed in a separate pressure vessel 342, 344, 346, 348, 350, 352, 354, 356, 358, 360, 362, 364, 366, 368, 370, 372, 374, 376, 378, and 380. Alternatively, the first group of stages 301-319 may be installed in a single pressure vessel (not shown) wherein interstage reactant gas flows through open flow regions between stages and reactant gas from manifold 347 is injected into the respective flow regions between the stages.

The reactant feed gas in manifold 347 is divided into ten individual streams, and the first of these streams provides a reactant feed gas in line 357 that is mixed with the steam feed in line 351. The remaining nine reactant gas streams provide reactant interstage feed gas streams that are mixed with the corresponding interstage reactant gas streams between pairs of adjacent stages 301 through 319 as shown. Similarly, the reactant feed gas in manifold 349 is divided into ten individual streams to provide reactant interstage feed gas streams that are mixed with the corresponding interstage reactant gas streams between pairs of adjacent stages 321 through 341 as shown. The second group of stages 321-341 may be installed in a single pressure vessel (not shown) wherein interstage reactant gas flows through open flow regions between stages and reactant gas from manifold 349 is injected into the respective flow regions between the stages.

Manifold 347 may be designed to provide generally equal flow rates of reactive gas into stages 301 to 319; alternatively, the manifold may be designed to provide a different flow rate to each stage or groups of stages for reaction control purposes. Likewise, manifold 349 may be designed to provide generally equal flow rates of reactive gas into stages 321 to 341; alternatively, the manifold may be designed to provide a different flow rate to each stage or groups of stages for reaction control purposes.

A first preheated oxidant gas is introduced via line 359 into manifold 361 and is divided into ten portions to provide oxidant gas to the oxidant sides of stages 301 to 319 as shown. A second preheated oxidant gas is introduced via line 363 into manifold 365 and is divided into ten portions to provide oxidant gas to the oxidant sides of stages 321 to 341 as shown. The first and second preheated oxidant gas streams may be provided from a common upstream heater (not shown) and may be air heated to a temperature of 600 to 1150° C. Oxygen permeates through the membranes in the stages and reacts with the reactive components on the reactant sides of the stages as described earlier above. Oxygen-depleted non-permeate gas is withdrawn from stages 301-319 via lines feeding into manifold 367 and the gas is discharged via line 369. Similarly, oxygen-depleted non-permeate gas is withdrawn from stages 321-341 via lines feeding into manifold 371 and the gas is discharged via line 373. Heat and/or pressure energy may be recovered from the withdrawn non-permeate gas by any of the known methods described in the art.

Manifold 361 may be designed to provide generally equal flow rates of oxidant gas into stages 301 to 319; alternatively, the manifold may be designed to provide a different flow rate to each stage or groups of stages, for example, for reaction and/or temperature control purposes. Likewise, manifold 365 may be designed to provide generally equal flow rates of oxidant gas into stages 321 to 341; alternatively, the manifold may be designed to provide a different flow rate to each stage or groups of stages, for example, for reaction and/or temperature control purposes.

The temperatures in the stages and the reactions through the stages can be regulated by controlling the flow rates of reactant and oxidant gases to the stages and the operating conditions within the stages. This may be accomplished, for example, by controlling the flow rates of reactant gas into manifolds 347 and 349 by control valves 375 and 377, respectively, and/or by controlling the flow rates of oxidant gas into manifolds 361 and 365 by control valves 379 and 381, respectively. For example, control of the reactant gases to the group of stages 301 to 319 may be effected by temperature indicator/controller 383, which sends control signals via control line 385 to control valve 375. Likewise, control of the reactant gases to the group of stages 321 to 341 may be effected by temperature indicator/controller 389, which sends control signals via control line 391 to control valve 377. In another example, temperature indicator/controller 383 may be located on oxygen-depleted non-permeate gas manifold 367 (not shown) and/or on oxygen-depleted non-permeate gas discharge line 369 (not shown). Likewise, temperature indicator/controller 389 may be located on oxygen-depleted non-permeate gas manifold 371 (not shown) and/or on oxygen-depleted non-permeate gas discharge line 373 (not shown). Control of oxidant gases to the group of stages 301 to 319 may be, for example, effected by control valve 379 located on the oxidant gas stream upstream of the stages (as shown), or located on the oxygen-depleted non-permeate gas stream downstream of the stages (not shown). Likewise, control of oxidant gases to the group of stages 321 to 341 may be, for example, effected by control valve 381 located on the oxidant stream upstream of the stages (as shown), or located on the oxygen-depleted non-permeate gas stream downstream of the stages (not shown). In a typical embodiment, flow rates of oxidant gases fed to the stages may be varied to maintain target oxygen concentration in oxygen-depleted non-permeate gas withdrawn from the stages, for example through manifolds 367 and 371. For example, oxygen concentration may be monitored by an oxygen analyzer/indicator controller (not shown) located on manifold 367 and/or discharge 369, which may send control signals via a control line (not shown) to control valve 379. Likewise, oxygen concentration may be monitored by an oxygen analyzer/indicator controller (not shown) located on manifold 371 and/or discharge 373, which may send control signals via a control line (not shown) to control valve 381. Flow rate of permeated oxygen through the membranes may also be affected by the operating conditions (e.g. pressure and/or temperature) within the stage, particularly in the vicinity of the membrane permeation surface. In another embodiment, any or all feed gases (e.g. reactant feed gas, reactant interstage feed gas, and/or oxidant gas) to a stage or series of stages may be omitted from or bypassed around the stage or series of stages to affect temperatures and/or reactions.

The staged ITM reactor systems described above utilize reactant gas streams that may include any of oxygen, steam, hydrocarbons, pre-reformed mixtures of steam and hydrocarbon feed gas, hydrogen, carbon monoxide, carbon dioxide, and/or carbon dioxide containing gas. Reactions that occur in the staged reactor systems may include, for example, partial oxidation, complete oxidation, steam reforming, carbon dioxide reforming, water-gas shift, and combinations thereof to produce synthesis gas. Certain of these reactions are strongly exothermic and others are endothermic. Because ITM systems generally require a narrow operating temperature range, proper control of the exothermic and endothermic reactions is required. The embodiments described above enable inherently stable operation in which the temperatures of the membrane system can be controlled within the required ranges.

The multiple reactant-staged membrane oxidation systems described above utilize at least two stages in series and may utilize up to 10 stages, up to 20 stages, up to 100 stages, or even greater than 100 stages in series depending on specific operating and product requirements. The embodiments are designed for the generation of synthesis gas, but may be applied to any oxidation or partial oxidation processes utilizing oxygen provided by permeation through ion transport membranes. When utilized for the generation of synthesis gas, the oxidant gas typically is preheated air and steam is introduced into the reactant side of the first reactor stage. The reactant gas, for example pre-reformed natural gas, is divided into multiple streams (not necessarily equal), which are subsequently introduced into the multiple reactor stages. In some embodiments, it is preferable that the reactant gas in each stage approach chemical equilibrium with respect to the steam reforming reaction, carbon dioxide reforming reaction, and/or the water gas shift reaction when catalysts for these reactions are provided in each stage.

The reactant gas entering a stage, exiting a stage, and/or exiting optional catalyst (e.g. catalyst 1d on FIG. 1) thus may be at or near chemical equilibrium with respect to these reactions.

A flow of steam may be introduced into the reactant side of the first stage as shown in FIGS. 2 and 3 for the purpose of minimizing temperature excursions and enabling the process to operate at or near equilibrium in each of the stages. The term "temperature approach to equilibrium" for a given gas mixture is herein defined as the absolute value of the temperature difference between the actual temperature of the gas mixture and a calculated temperature at which the given reactants in the gas mixture would be at chemical equilibrium. Temperature approach to equilibrium may be expressed with respect to the gas mixture as a whole or with respect to a specific reaction or reactions (e.g., steam reforming, carbon dioxide reforming, and/or water-gas shift reactions) between specific reactants in the gas mixture. A typical temperature approach to equilibrium may be on the order of 0 to 100° F., and typically may be on the order of 0 to 20° F. When the catalyst is disposed on or adjacent the membranes, this approach will occur within the modules of the stage; when the catalyst is disposed following the membrane modules as shown in FIGS. 1 and 2, the approach to equilibrium will occur at the outlet of the catalyst module. When catalyst is disposed preceding the membrane modules, the approach to equilibrium will occur preceding the modules.

The temperature of the reactant side of the modules in each stage (and therefore the temperature of the entire stage) may be controlled by varying the amount and distribution of the reactant gas provided to each stage. The reactant side of each stage is generally reactant-rich (e.g., rich in oxidizable species) and the exothermic oxidation reactions which generate temperature rise are limited by the rates of oxygen permeation through the membrane. The endothermic reforming reactions which generate temperature drop are generally limited by both catalyst activity and by the amount of hydrocarbon, particularly methane, fed to each stage.

By conducting the overall reaction in multiple stages, sufficient catalyst may be provided within or between each of the stages such that the composition of the gas exiting a stage approaches equilibrium with respect to the reactions occurring in that stage prior to entering the next stage. This effectively tunes or regulates the catalyst activity such that endothermic reforming reactions and the associated temperature drop in each stage can be limited by the amount of hydrocarbon, particularly methane, fed to each stage as reactant interstage feed gas. Thus the hydrocarbon feed rate to each stage may be used to control the gas composition and temperature within and/or at the exit of the stage, and the composition and temperature of the gas can be made to approach equilibrium by controlling the hydrocarbon feed rate. A higher hydrocarbon feed rate will tend to cool the gas mixture via endothermic reforming, whereas a lower hydrocarbon feed rate will tend to yield higher temperatures by limiting the endothermic reforming that cools the reactant gas mixture.

If the oxidation reaction system is operated so that at least some of the reaction stages do not operate at or near equilibrium, varying the hydrocarbon feed rate to each stage also may be used to control the gas composition and temperature within and/or at the exit of the stage. A higher hydrocarbon feed rate and feed concentration will lead to increased rates of endothermic reforming reactions and thus tend to cool the gas mixture, whereas a lower hydrocarbon feed rate and feed concentration will lead to decreased rates of endothermic reforming reactions and thus tend to yield higher temperatures.

The membrane material used in the membrane oxidation reaction system must be operated within a specific temperature range. The upper temperature limit is established based on criteria including the kinetic decomposition of the material, the mechanical creep of the membranes, the degree of iron volatilization in systems using iron-containing oxides, membrane stability in a synthesis gas environment in the presence of volatilized iron, potential catalyst life issues, and other criteria. The lower temperature limit is established based on the potential for carbon dioxide-induced membrane degradation (discussed later), phase decomposition, and other criteria. The embodiments described above provide a membrane-based oxidation reaction system which provides for inherently stable performance during steady-state operation, startup, shutdown, turndown, and recovery from process upset conditions. This may be achieved by controlling the system within the critical ranges of gas composition and temperature required for stable and reliable membrane operation.

Mixed conducting metal oxide membranes and membrane modules are mechanically fragile ceramic bodies. Mechanical stresses may accumulate as a result of temperature and composition gradients within the ceramic material, and these stresses can damage the membranes as well as joints and seals in the membrane modules. The use of reactant-staged membrane reactors allows for the minimization of these thermal and concentration gradients within the ceramic components of the reactor system.

Hydrocarbon-containing components in the feed gas may form elemental carbon (soot) at the operating temperatures of ITM oxidation reactors, which may operate in a typical range of 600 to 1150° C. (1112 to 2102° F.). Undesirable formation of soot in the ITM modules, control valves, and internal piping will occur at these temperatures in certain reactive gas composition ranges. The potential for soot formation decreases as temperature decreases, and soot formation may be substantially lower in the range 600 to 750° C. (1112 to 1382° F.) than at higher I™ operating temperatures of 850 to 1150° C. (1562 to 2102° F.). The potential for soot formation decreases further and becomes readily manageable at temperatures in the range 500 to 650° C. (932 to 1202° F.) and below. Operation to avoid soot formation may be accomplished by utilizing the reactant-staged ITM system described above with appropriate control of the distribution, composition, and temperature of the reactant feed gas and reactant interstage feed gas among the stages.

The use of a reactant-staged ITM reactor system allows the introduction of the reactant gases at temperatures significantly below the operating temperatures of the ITM modules, which allows operation of the reactant gas feed system at lower temperatures. As a result, expensive high-temperature alloys may not be required for components of the reactant gas feed system.

Other potential problems in the operation of ITM oxidation reactor systems may be minimized or eliminated by the use of the reactant-staged embodiments described above. For example, oxygen flux may vary among membrane modules due to variations in manufacturing, installation, and/or operation. By staging the reactor system with respect to the reactant gases, control schemes may be utilized so that the reactor system can tolerate reasonable variations in oxygen flux among the multiple membrane modules in the system. Flux variations among the modules may be compensated for by controlling the flow and/or composition of the reactant interstage feed gas among the stages. Reactant-staged operation also can be used to address operating problems associated with startup, turndown, process upsets, and shutdown of ITM oxidation reactor systems.

The reactant-staged membrane oxidation reactor systems are illustrated above for the generation of synthesis gas from natural gas. The systems alternatively may be used for other oxidation or partial oxidation processes such as, for example, combustion (e.g. for power, steam, or heat generation) or reforming of hydrocarbons heavier than methane.

It is well known in the field of synthesis gas production that the injection of $CO_2$ into the hydrocarbon feed to a steam-methane reformer effectively reduces the $H_2$/CO molar ratio in the synthesis gas product. This is often required to provide specific $H_2$/CO ratios in the synthesis gas feed to downstream chemical processes. $CO_2$ separated from the synthesis gas product can be recycled to the reformer feed, or $CO_2$ can be imported for this purpose from an outside source. For example, $CO_2$-containing offgas from a downstream Fischer-Tropsch (F-T) hydrocarbon synthesis process may be recycled to the feed of the synthesis gas generation process to adjust the synthesis gas product $H_2$/CO molar ratio to about 2:1 as required for the F-T process. This external recycle step avoids the need for an acid gas removal system to remove $CO_2$ from the synthesis gas produced; instead, the F-T offgas containing about 60 vol % $CO_2$ is recovered at high pressure along with other useful components for recycle, including light hydrocarbons, $H_2$, and CO. This external recycle step also serves to reduce $CO_2$ emissions while increasing the efficiency of carbon conversion into useful products. Only a modest amount of compression is required to overcome pressure drop through the synthesis gas generation process and the F-T process.

For an ITM oxidation process operated with an overall reactant feed gas steam-to-carbon (S/C) molar ratio of 1.5, which is desirable to minimize methane slip (i.e. unreacted methane in the product synthesis gas) and carbon deposition, the product synthesis gas $H_2$/CO molar ratio would be about 3:1 (refer to Example 1 below). As described above, a Fischer-Tropsch (F-T) reactor system generally requires a $H_2$/CO ratio of about 2:1. Other processes require even lower $H_2$/CO ratios; for example, certain oxo-alcohol synthesis processes require a 1:1 $H_2$/CO ratio in the synthesis gas feed.

It has been found that in the production of synthesis gas by ITM oxidation reactors, high concentrations of $CO_2$ may react with and decompose the material used in the membranes. The terms "decompose" or "decomposed" mean that the original membrane composition or stoichiometry is changed, for example by the reaction with $CO_2$. Exemplary membranes are complex multi-component metal oxides consisting of alkaline earth metals (e.g., Ca), transition metals, and lanthanum or lanthanides. The driving force for the reaction of these materials with $CO_2$ is the large negative free energy of formation of the alkaline earth carbonates, for example, $CaCO_3$. A representative chemical reaction for the decomposition of a perovskite in the presence of $CO_2$ can be expressed in terms of the $CO_2$ partial pressure, $p_{CO2}$, at equilibrium conditions, which may be defined as $p_{CO2}*$. At $CO_2$ partial pressures less than $p_{CO2}*$, decomposition via $CO_2$ reactions will not occur and the membrane material will be stable. At $CO_2$ partial pressures greater than $p_{CO2}*$, the membrane material will decompose via reaction with $CO_2$. The value of $p_{CO2}*$ is a function of temperature, oxygen partial pressure, and membrane composition, and $p_{CO2}*$ generally decreases as temperature decreases.

In addition, the membranes used in ITM oxidation reactors have an upper operating temperature limit defined by other phenomena such as, for example, kinetic decomposition, excessive material creep, reduction or volatilization of transition metal species (e.g. Fe), and potential catalyst life issues.

Embodiments of the present invention may be applied to eliminate the problem of membrane degradation by providing methods to recycle $CO_2$ in membrane reactor systems for controlling the product synthesis gas $H_2/CO$ ratio while ensuring that $p_{CO2}$ remains less than $p_{CO2}*$ throughout the membrane reactor system. The use of reactant-staged membrane oxidation reactor systems allows the controlled interstage introduction of carbon dioxide so that $p_{CO2}$ remains less than $p_{CO2}*$ in all stages. Lower carbon dioxide concentrations allow lower operating temperature limits, which in turn allow a larger operating temperature window, thereby easing constraints on process control and providing a more operable process.

As described in detail below, $p_{CO2}*$ is a strong function of temperature, and the introduction of $CO_2$-containing gas into the membrane reactor system may be accomplished advantageously by dividing the $CO_2$-containing gas into two or more reactant interstage feed gas streams for injection between selected stages of a reactant-staged ITM oxidation system. The $CO_2$-containing gas may be injected into one or more interstage points in the reactor system where higher temperatures lead to higher values of $p_{CO2}*$.

Figure 4:
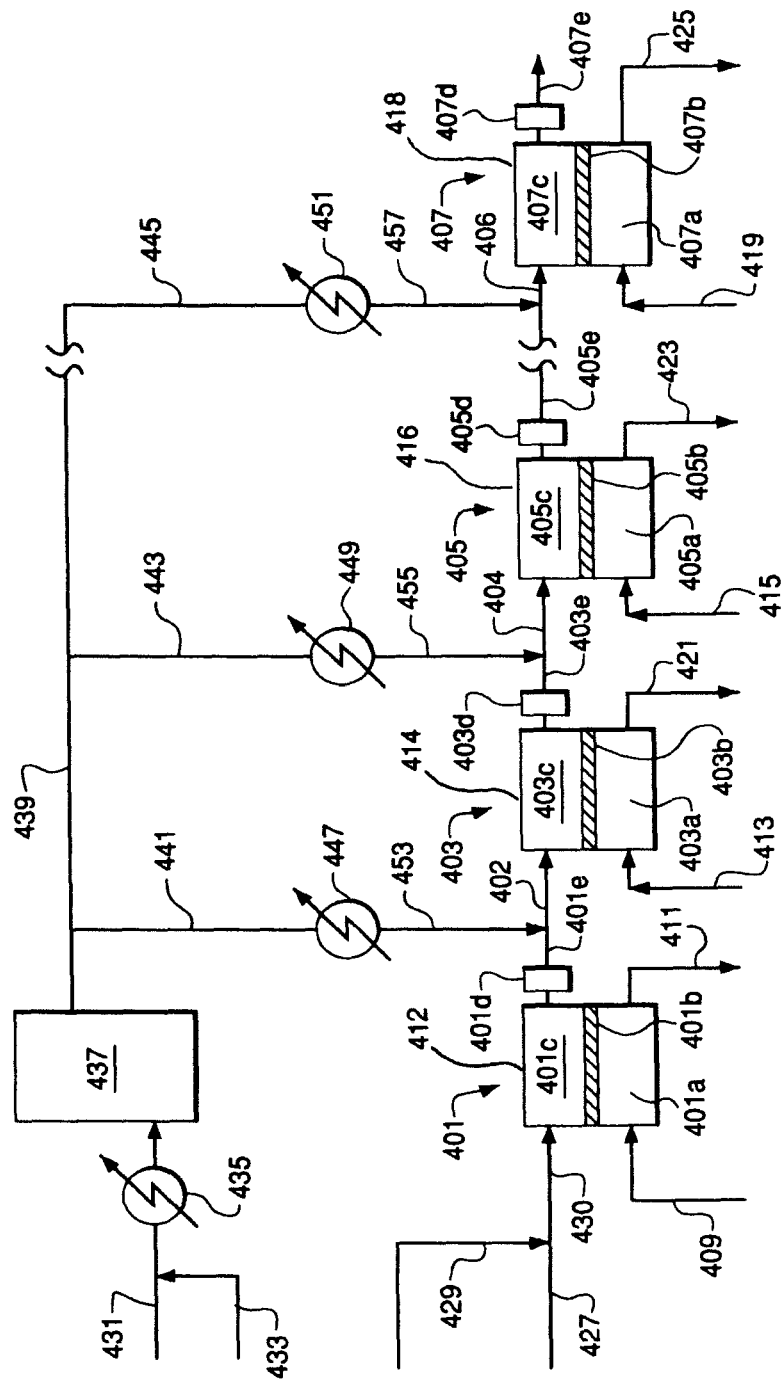
FIG. 4 is a schematic flow diagram of another embodiment of the invention.

This embodiment is illustrated in the schematic flow diagram of FIG. 4. The exemplary reactant-staged membrane oxidation system comprises first stage 401, second stage 403, third stage 405, and last or $n^{th}$ stage 407. Each stage is illustrated schematically as a generic module having an oxygen permeable membrane that divides the module into an oxidant side and a permeate or reactant side. As explained above, a stage can comprise any number of membrane modules arranged in series and/or parallel and may include one or more catalysts selected from oxidation catalyst, steam reforming catalyst, carbon dioxide reforming catalyst, and water gas shift catalyst. Any desired number of stages may be used as long as there are at least two stages.

First stage 401 comprises oxidant side 401a, membrane 401b, reactant side 401c, optional catalyst 401d, and appropriate gas inlet and outlet regions. Optional catalyst 401d is shown here as immediately following the module, but alternatively or additionally catalyst may be disposed immediately preceding the module (not shown) or within or around the module in any desired configuration (not shown). Similarly, second stage 403 comprises oxidant side 403a, membrane 403b, reactant side 403c, appropriate gas inlet and outlet regions, and optional catalyst 403d, which is shown here as immediately following the module. Alternatively or additionally, catalyst may be disposed immediately preceding the module (not shown) or within or around the module in any desired configuration (not shown). Similarly, third stage 405 comprises oxidant side 405a, membrane 405b, reactant side 405c, appropriate gas inlet and outlet regions, and optional catalyst 405d. Optional catalyst 405d is shown here as immediately following the module, but alternatively or additionally catalyst may be disposed immediately preceding the module (not shown) or within or around the module in any desired configuration (not shown). Last stage 407 comprises oxidant side 407a, membrane 407b, reactant side 407c, appropriate gas inlets and outlets, and optional catalyst 407d, shown here as immediately following the module. Alternatively or additionally, catalyst may be disposed immediately preceding the module (not shown) or within or around the module in any desired configuration (not shown). Product gas from last or $n^{th}$ stage 407 is withdrawn via product line 407e.

Interstage reactant gas flows from stage 401 via line 401e, from stage 403 via line 403e, and from stage 405 via line 405e.

An oxidant gas, for example, preheated air or oxygen-containing combustion products from a combustor operated with excess air, is introduced via line 409 into oxidant side 401a of first stage 401 and contacts the oxidant side of membrane 401b, a portion of the oxygen permeates through membrane 401b, and oxygen-depleted gas exits first stage 401 via line 411. Similarly, additional oxidant gas streams may be introduced via lines 413, 415, and 419 into stages 403, 405, and 407, respectively, and oxygen-depleted gas may exit the stages via lines 421, 423, and 425, respectively.

A reactant gas feed such as, for example, pre-reformed natural gas is provided via line 427 and is mixed with steam provided via line 429, and the mixed reactant gas feed is introduced into reactant side 401c of stage 401. Another gas stream comprising reactant components is provided via line 431 from a source different than the source of the reactant gas feed provided via line 427. The gas in line 431 may be, for example, offgas from a downstream process that utilizes synthesis gas produced by the staged oxidation reactor system of FIG. 4. The downstream process may be a hydrocarbon synthesis process (e.g., a Fischer-Tropsch process) or an oxygenated hydrocarbon synthesis process (e.g., an alcohol synthesis process). In one embodiment described in more detail below, the gas in line 431 is offgas from a Fischer-Tropsch hydrocarbon synthesis reactor system that contains a major concentration of $CO_2$, smaller concentrations of $H_2$ and $CO$, and some unreacted $CH_4$. This gas in line 431 optionally may be combined with steam provided via line 433, the mixture heated in pre-heater 435, and the heated mixture introduced into steam-methane reformer 437 in which some of the unreacted methane is converted to additional $H_2$ and carbon oxides. In some situations, it may not be necessary to reform the offgas before recycle, and reformer 437 would not be required.

The partially reformed offgas stream flows via manifold 439, is divided into separate streams in lines 441, 443, and 445, and these steams are optionally heated in heat exchangers 447, 449, and 451 to provide reactant interstage feed gas in lines 453, 455, and 457. The reactant gas feed in reactant side 401c of first stage 401 reacts with permeated oxygen, reforming and/or shift reactions may be promoted by optional catalyst 401d, and the first stage effluent flows via flow path 401e. Reactant interstage feed gas is provided via line 453, is mixed with first stage effluent in flow path 401e, and the mixed interstage reactant gas flows into reactant side 403c of second stage 403. Alternatively, the reactant interstage feed gas in line 453 may be introduced directly into the reactant side of stage 403 and/or upstream of catalyst 401d.

The gas in reactant side 403c of second stage 403 reacts with permeated oxygen, reforming and/or shift reactions may be promoted by optional catalyst 403d, and the second stage effluent flows via flow path 403e. Reactant interstage feed gas is provided via line 455, is mixed with second stage effluent in flow path 403e, and the mixed interstage reactant gas flows into reactant side 405c of third stage 405. Alternatively, the reactant interstage feed gas in line 455 may be introduced directly into the reactant side of stage 405 and/or upstream of catalyst 403d.

The gas in reactant side 405c of third stage 405 reacts with permeated oxygen, reforming and/or shift reactions may be promoted by optional catalyst 405d, and the third stage effluent flows via flow path 405e. Reactant interstage feed gas is provided via line 457, is mixed with third stage effluent in flow path 405e, and the mixed interstage reactant gas flows into reactant side 407c of last stage 407. Alternatively, the reactant interstage feed gas in line 457 may be introduced directly into the reactant side of stage 407 and/or upstream of catalyst 405d.

The gas in reactant side 407c of last stage 407 reacts with permeated oxygen, reforming and/or shift reactions may be promoted by optional catalyst 407d, and the last stage effluent flows via line 407e to provide a synthesis gas product. The product gas may be at a temperature of 600 to 1150° C. and a pressure of 2 to 40 atma, and the gas typically comprises hydrogen, carbon monoxide, water, carbon dioxide, and methane. Any number of additional stages may be utilized between third stage 405 and last stage 407 if desired.

In the illustration of FIG. 4 described above, interstage reactant gas flows from stage 401 via flow path 401e, from stage 403 via flow path 403e, and from stage 405 via flow path 405e. In one embodiment, each of stages 401, 403, 405, and 407 may be enclosed in a separate pressure vessel 412, 414, 416, and 418; in this case, flow paths 401e, 403e, and 405e are pipes, conduits, or closed channels between the vessels. In another embodiment, stages 401, 403, 405, and 407 may be enclosed in a single pressure vessel (not shown) such that reactant gas can flow through the reactant zones of each stage in succession; in this case, flow paths 401e, 403e, and 405e are open regions between stages through which gas can flow from the reactant gas outlet region of one stage into the reactant gas inlet region of the following stage.

The embodiment of FIG. 4 is particularly useful when $CO_2$-rich gas (for example, recycle gas from an external process) is utilized for the purpose of controlling the $H_2/CO$ ratio in the product synthesis gas. As mentioned above, it has been found that the mixed conducting metal oxide materials used in the membranes may react with $CO_2$ and degrade or decompose when the $CO_2$ partial pressure in the reactive gas, $p_{CO2}$, is greater than a critical threshold partial pressure defined as $p_{CO2}^*$. The $CO_2$ partial pressures in the reactor stages therefore should be controlled as described below to minimize or eliminate membrane degradation.

In the process of FIG. 4, a steam-to-carbon (S/C) molar ratio of about 1.5 in the reactant feed gas is desirable to minimize methane slip and carbon deposition in the system. With this reactant feed gas, the product synthesis gas $H_2/CO$ molar ratio would be about 3:1. The injection of the $CO_2$-rich gas stream into the reactant feed gas to first stage 401 would effectively reduce the product $H_2/CO$ ratio to a level required for downstream chemical processes. For example, this ratio should be about 2:1 for a Fischer-Tropsch hydrocarbon synthesis process. At $CO_2$ partial pressures greater than the critical threshold, $p_{CO2}^*$, however, the membrane material may react with the $CO_2$ and decompose. This can be avoided by operating the membrane reactor system so that $p_{CO2}$ less than $p_{CO2}^*$ throughout the system, thereby enhancing the operating life of the membrane. It may not be possible to maintain $p_{CO2}$ less than $p_{CO2}^*$ when all of the recycled $CO_2$ is introduced into the reactant gas feed to the first stage.

Figure 5:
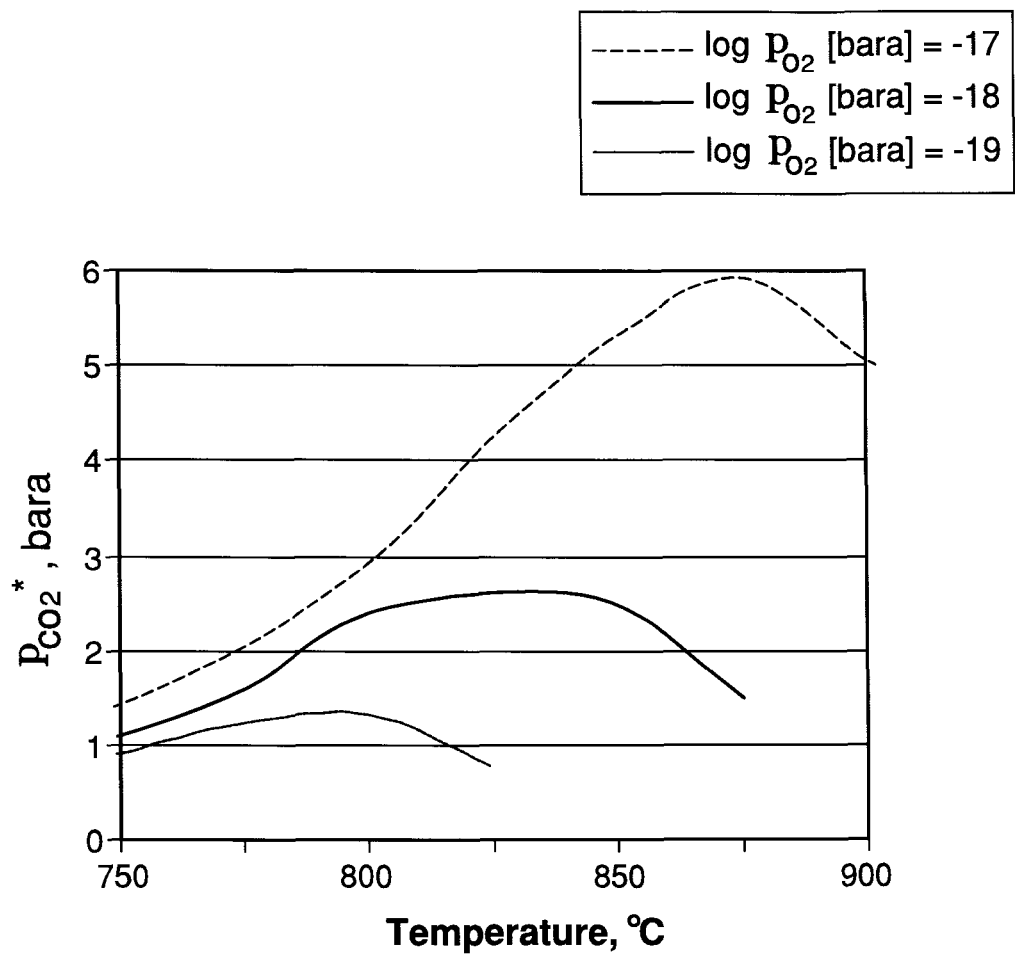
FIG. 5 is a plot of $p_{CO2}^*$ vs. temperature at various equilibrium $O_2$ partial pressures for the mixed conducting metal oxide membrane material $La_{0.9}Ca_{0.1}FeO_{3-\delta}$.

FIG. 5 shows the behavior of $p_{CO2}^*$ as a function of temperature and oxygen partial pressure for a typical material used in ITM reactor systems, $La_{0.9}Ca_{0.1}FeO_{3-\delta}$, wherein the value of $\delta$ makes the compound charge neutral. This plot was generated from thermodynamic calculations of the complex phase equilibria exhibited by these materials. The oxygen partial pressure, $p_{O2}$, of the synthesis gas stream is itself determined from thermodynamic calculations rather than measured directly; it is also a strong function of temperature and synthesis gas composition.

Because $p_{CO2}^*$ is a strong function of temperature, $CO_2$ injection is problematic at lower temperatures typical of the inlet conditions to a membrane reactor system. Since the synthesis gas generation process is net exothermic and the reactant gas temperature increases down the length of the reactor, it can be advantageous to inject the $CO_2$ at one or more intermediate points in the reactor system where higher temperature leads to much higher values of $p_{CO2}^*$. This is especially beneficial when the $CO_2$ injection stream is significantly cooler than the reactant feed stream to the membrane reactor and the injection itself causes a substantial drop in temperature. In this case, dividing the $CO_2$ injection stream into multiple intermediate injections as described above can mitigate the temperature drop at each injection point. A significant temperature drop is generally undesirable because it creates a locally depressed value of $p_{CO2}^*$ and also leads to significant thermal stress in the membranes.

As pointed out above, maintaining $p_{CO2} < p_{CO2}^*$ throughout the system during operation is beneficial to long-term membrane life in an ITM reactor system. FIG. 5, which is a plot of $p_{CO2}^*$ vs. temperature at various equilibrium $O_2$ partial pressures for the mixed conducting metal oxide membrane material $La_{0.9}Ca_{0.1}FeO_{3-\delta}$, shows that this task is most difficult at lower temperatures typical of the inlet conditions to an ITM synthesis gas generation process. Since the oxidation reactions in the process are net exothermic and the reactant gas temperature increases down the length of the reactor, injection of $CO_2$-containing gas is best accomplished at one or more intermediate points in the staged reactor system where the higher temperature and corresponding oxygen partial pressure lead to much higher values of $p_{CO2}^*$. As long as the cooling effects are mitigated properly, the cooling provided by $CO_2$-containing gas will be beneficial to the process because of the upper operating temperature limit of the membranes imposed by other material requirements.

Cooling provided by $CO_2$-containing gas follows several mechanisms, all of which are most beneficial when occurring in a higher temperature zone downstream from the inlet to the membrane reactor. Obviously, the $CO_2$-containing gas stream can provide sensible cooling. In addition, the presence of $CO_2$ leads to the endothermic reverse shift reaction and the endothermic $CO_2$ reforming reaction; when these reactions occur on or near the membrane surfaces, they provide beneficial membrane cooling. Furthermore, any hydrocarbon components present in the $CO_2$-containing gas stream may undergo the endothermic reforming reaction on the membranes, leading to further cooling. Finally, intermediate injection(s) of $CO_2$-containing gas leads to less mass flow and lower pressure drop at the front end of the membrane reactor.

The embodiment described above illustrates the use of ITM reactor systems for the production of synthesis gas with controlled $H_2/CO$ ratios. The embodiment may be applied to any partial oxidation reaction with introduction of a $CO_2$-containing stream.

The following Examples illustrate embodiments of the present invention but do not limit embodiments of the invention to any of the specific details described therein.

Example 1

An embodiment of the invention similar to FIGS. 2 and 3 was simulated using the process simulator Aspen Plus™ from Aspen Technology, Inc. The simulation utilized 100 membrane reactor stages in series wherein the reactant gas feed is divided into ten portions (not necessarily equal) and each portion is divided into ten equal sub-portions. Each sub-portion is fed to the inlet of a corresponding stage wherein the sub-portion to the first stage is mixed with steam and each of the remaining sub-portions is provided as a reactant interstage feed gas that is mixed with a corresponding interstage reactant gas stream.

The following specific process features and parameters were used in the simulation:

Total sum of oxygen permeation in all stages is 1000 kgmol/hr with an evenly-distributed oxygen flux of 10 kgmol/hr in each stage.

Overall steam-to-carbon molar ratio is 1.5 in the reactant feed to the system wherein the steam-to-carbon ratio is defined as total water divided by total organic carbon in the stream; carbon contained in carbon dioxide and carbon monoxide is not included.

Natural gas feed has the following composition: 94.73% methane, 3.16% ethane, 0.54% propane, 0.18% butane, 0.06% pentane, 0.04% hexane, 0.71% carbon dioxide, 0.58% nitrogen (compositions in mole %).

A small amount of hydrogen is added to the natural gas, as is typical for desulfurization, e.g. approximately 3% of the total carbon feed on a molar basis.

Reactant gas feed is provided by pre-reforming natural gas in an adiabatic pre-reformer with an inlet temperature of 510° C. to convert hydrocarbons heavier than methane.

Reactant gas pressure on the reactant sides of all stage membrane modules is 30.3 bara (440 psia) and the oxidant gas pressure on the oxidant sides of all stage membrane modules is 1.7 bara (25 psia).

TABLE 1

Reactant Feed Distribution for Example 1

| Distribution of Pre-reformed Reactant Feed to Stage Groups | Portion | Flow to Stage Group (kgmol/hr) | (%) |
|---|---|---|---|
| Stages 1 through 10 | 1 | 332.2 | 9.6 |
| Stages 11 through 20 | 2 | 330.7 | 9.5 |
| Stages 21 through 30 | 3 | 342.4 | 9.9 |
| Stages 31 through 40 | 4 | 358.7 | 10.3 |
| Stages 41 through 50 | 5 | 374.5 | 10.8 |
| Stages 51 through 60 | 6 | 388.1 | 11.2 |
| Stages 61 through 70 | 7 | 399.2 | 11.5 |
| Stages 71 through 80 | 8 | 408.2 | 11.7 |
| Stages 81 through 90 | 9 | 415.6 | 12.0 |
| Stages 91 through 100 | 10 | 125.2 | 3.6 |
| Total to all stages | | 3474.9 | 100.0 |

Natural gas at 2142.9 kgmol/hr, 67.3 kgmol/hr hydrogen, and 1113.5 kgmol/hr steam are mixed and heated to 510° C. The heated mixture is pre-reformed in an adiabatic pre-reformer reactor and exits the adiabatic pre-reformer reactor at 474° C. The pre-reformed mixture is divided into the portions given in Table 1.

Each of portions 1-10 in Table 1 is divided into ten equal sub-portions. Steam at 2227.1 kgmol/hr is preheated to 875° C. and mixed with a first sub-portion of portion 1, and the mixture is introduced to the reactant side of the first stage. The other 99 sub-portions (all of the sub-portions except the first sub-portion of portion 1) are provided as reactant interstage feed gas streams, each of which is mixed with a respective interstage reactant gas stream and fed to the inlet of each of the respective 99 stages. Air is provided to the oxidant side of each stage at 855° C., and oxygen-depleted air is withdrawn from the oxidant side of each stage.

Sufficient catalyst is provided in this Example on the reactant sides of all membrane modules such that the steam reforming, carbon dioxide reforming, and water-gas shift reactions occur within the modules and maintain essentially chemical equilibrium conditions throughout the 100-stage reactor system. A final synthesis gas product is withdrawn from stage 100 at 900° C. and 9442.2 kgmol/hr with a composition of 46.7% hydrogen, 3.0% methane, 6.7% carbon dioxide, 14.1% carbon monoxide, 29.4% water, and 0.1% nitrogen (compositions in mole %).

Figure 6:
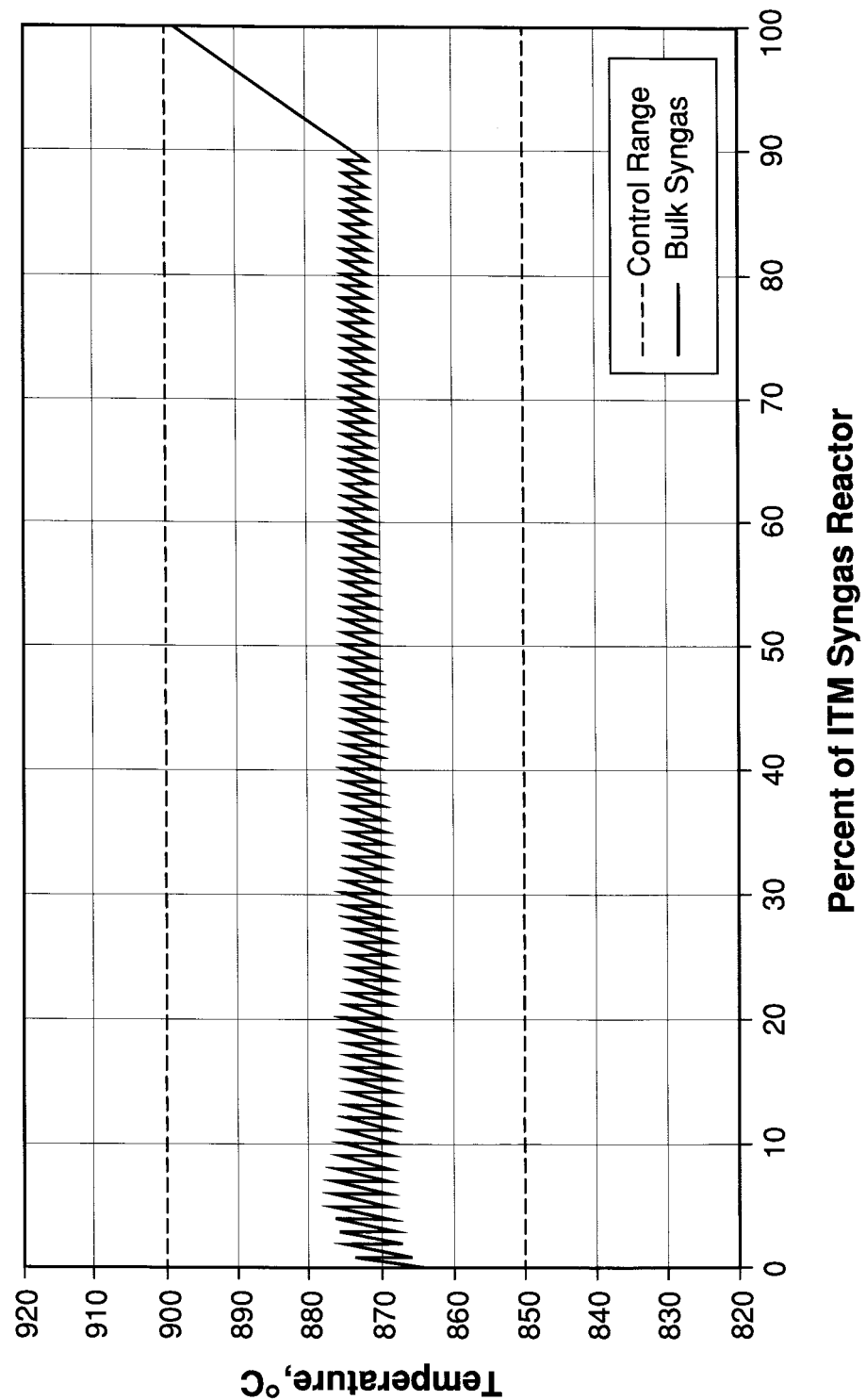
FIG. 6 is a plot of the temperature of the reactant gas as a percentage of a group of 100 reaction stages from the reactant feed inlet (0) to the product outlet (100) for Example 1.

A summary of the simulation results is given in Table 2 showing the reactant gas temperature and composition from the first reactor stage and from each succeeding group of 10 stages. FIG. 6 shows the temperature of the reactant gas at the inlet and outlet of each stage plotted as a percentage of the group of 100 reaction stages from the reactant feed inlet (0) to the product outlet (100). It is seen that staged operation of the reactor system controls the reactant gas temperature within the preferred membrane temperature range of 850 to 900° C. The temperature of the reactant gas is generally flat at about 875° C. through the first 90 stages and rises to 900° C. in the last 10 stages. The saw-tooth temperature profile is attributed to quenching of the reactant gas by the introduction of cold (474° C.) pre-reformed reactant feed gas via the reactant interstage feed lines into the interstage reactant gas between each of the 100 stages.

TABLE 2

Simulation Summary for Example 1

| | Pre-Ref'r Feed | ITM Reactor Feed | Total $O_2$ Permeate | Reactant Gas at Outlet of Reactor Stage No. | | | | | | | | | | |
|---|---|---|---|---|---|---|---|---|---|---|---|---|---|---|
| | | | | 1 | 10 | 20 | 30 | 40 | 50 | 60 | 70 | 80 | 90 | 100 |
| Temp., ° C. | 510 | 474 | | 874 | 875 | 875 | 874 | 875 | 875 | 875 | 875 | 875 | 900 | 900 |
| Press., bara | 33.3 | 327 | | 30.3 | 30.3 | 30.3 | 30.3 | 30.3 | 30.3 | 30.3 | 30.3 | 30.3 | 30.3 | 30.3 |
| Flow, kgmol/hr | 3324 | 3475 | 1000 | 2301.4 | 2969.5 | 3696.0 | 4424.5 | 5162.2 | 5910.2 | 6667.7 | 7433.2 | 8205.2 | 8982.7 | 9442.2 |
| $H_2$, mol % | 2.02 | 7.31 | | 2.78 | 19.91 | 29.75 | 35.44 | 39.00 | 41.36 | 42.98 | 44.13 | 44.97 | 45.59 | 46.69 |
| $CH_4$, mol % | 61.08 | 61.91 | | 0.00 | 0.02 | 0.20 | 0.60 | 1.14 | 1.76 | 2.40 | 3.01 | 3.59 | 4.13 | 2.98 |
| $CO_2$, mol % | 0.46 | 2.50 | | 0.90 | 5.38 | 6.99 | 7.49 | 7.58 | 7.52 | 7.39 | 7.25 | 7.10 | 6.96 | 6.68 |
| CO, mol % | | 0.11 | | 0.03 | 1.82 | 4.38 | 6.58 | 8.33 | 9.70 | 10.80 | 11.67 | 12.38 | 12.97 | 14.09 |
| $H_2O$, mol % | 33.50 | 27.80 | | 96.28 | 72.83 | 58.62 | 49.82 | 43.85 | 39.55 | 36.32 | 33.82 | 31.83 | 30.21 | 29.43 |
| $N_2$, mol % | 0.37 | 0.36 | | 0.01 | 0.04 | 0.06 | 0.08 | 0.09 | 0.11 | 0.11 | 0.12 | 0.13 | 0.13 | 0.13 |
| $O_2$, mol % | | | 100 | | | | | | | | | | | |
| $C_2H_6$, mol % | 2.04 | | | | | | | | | | | | | |
| $C_3H_8$, mol % | 0.35 | | | | | | | | | | | | | |
| $C_4H_{10}$, mol % | 0.12 | | | | | | | | | | | | | |
| $C_6H_{12}$, mol % | 0.04 | | | | | | | | | | | | | |
| $C_6H_{14}$, mol % | 0.03 | | | | | | | | | | | | | |

Example 2

Operation of the system of Example 2 was simulated using the same simulation method and the same specific process features and parameters as in Example 1, except that catalyst is not used within the membrane modules. Instead, an adiabatic catalyst bed is provided at the exit of each stage (see FIGS. 1 and 2) to equilibrate the steam reforming, carbon dioxide reforming, and water-gas shift reactions. 2219.7 kgmol/hr steam is preheated to 860° C. and introduced to the first reactor stage. 2135.8 kgmol/hr natural gas, 67.0 kgmol/hr hydrogen, and 1109.9 kgmol/hr steam are mixed and preheated to 510° C., pre-reformed in an adiabatic pre-reformer reactor, and withdrawn from the adiabatic pre-reformer reactor at 474° C. The pre-reformed mixture is divided into the portions given in Table 3.

TABLE 3

Reactant Feed Gas Distribution for Example 2

| Distribution of Pre-reformed Reactant Feed to Stage Groups | Portion | Flow to Stage Group | |
|---|---|---|---|
| | | (kgmol/hr) | (%) |
| Stages 1 through 10 | 1 | 335.1 | 9.7 |
| Stages 11 through 20 | 2 | 327.8 | 9.5 |
| Stages 21 through 30 | 3 | 339.2 | 9.8 |
| Stages 31 through 40 | 4 | 352.1 | 10.2 |
| Stages 41 through 50 | 5 | 362.9 | 10.5 |
| Stages 51 through 60 | 6 | 372.4 | 10.8 |
| Stages 61 through 70 | 7 | 379.1 | 10.9 |
| Stages 71 through 80 | 8 | 385.6 | 11.1 |
| Stages 81 through 90 | 9 | 390.1 | 11.3 |
| Stages 91 through 100 | 10 | 219.2 | 6.3 |
| Total to all stages | | 3463.4 | 100.0 |

Each portion in Table 3 is divided into ten equal sub-portions. The preheated steam is mixed with a first sub-portion of portion 1, and the mixture is introduced to the reactant side of the first stage. The other 99 sub-portions (all of the sub-portions except the first sub-portion of portion 1) are provided as reactant interstage feed gas streams, each of which is mixed with a respective interstage reactant gas stream and fed to the inlet of each of the respective 99 stages. Air is provided to the oxidant side of each stage at 855° C., and oxygen-depleted air is withdrawn from the oxidant side of each stage. A final synthesis gas product is withdrawn from stage 100 at 900° C. and 9413.1 kgmol/hr with a composition of 46.7% hydrogen, 3.0% methane, 6.7% carbon dioxide, 14.1% carbon monoxide, 29.5% water, and 0.1% nitrogen (compositions in mole %).

Figure 7:
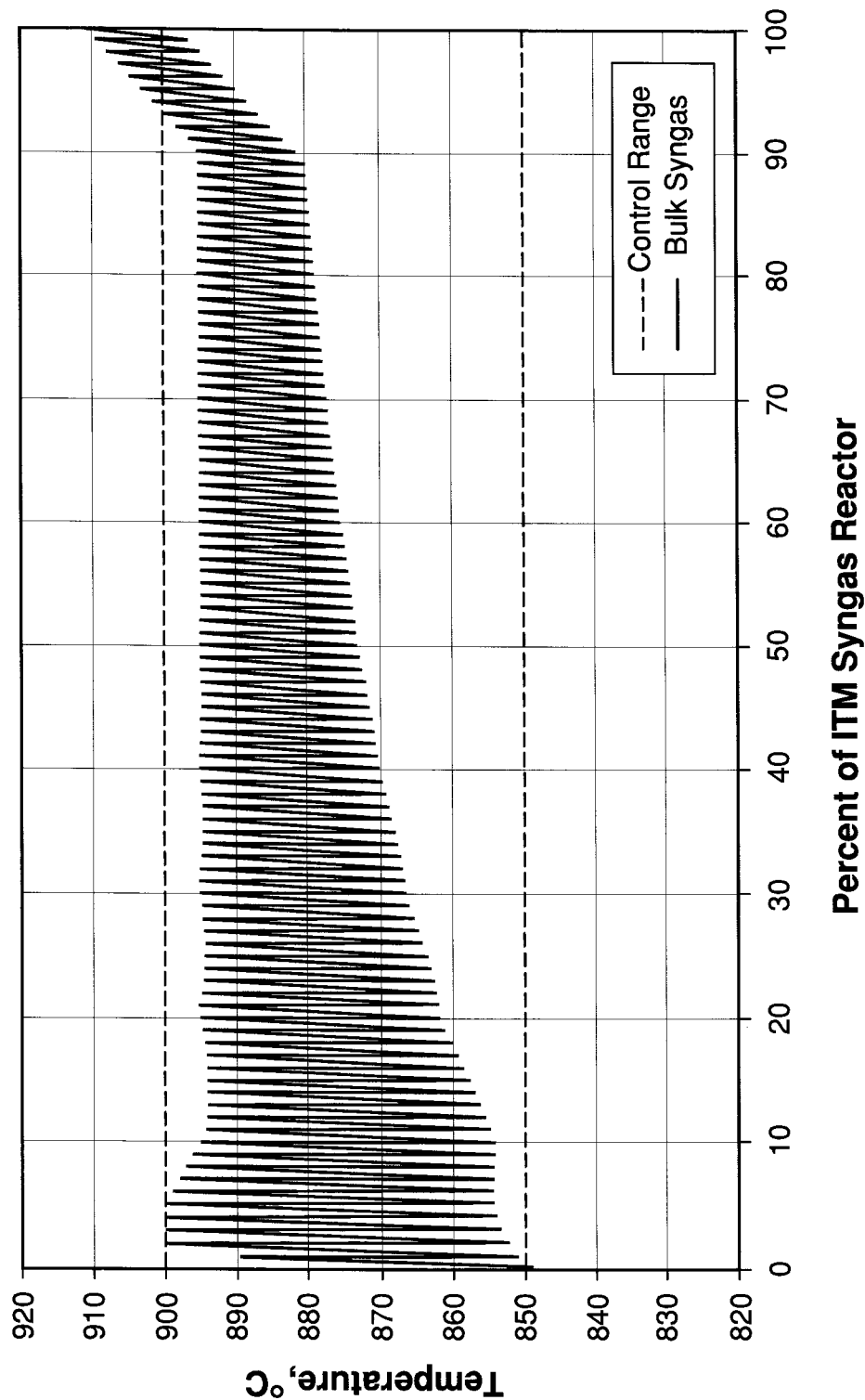
FIG. 7 is a plot of the temperature of the reactant gas as a percentage of a group of 100 reaction stages from the reactant feed inlet (0) to the product outlet (100) for Example 2.

A summary of the simulation results is given in Table 4 showing the reactant gas temperature and composition from the first reactor stage and from each succeeding group of 10 stages. FIG. 7 shows the temperature of the reactant gas at the inlet and outlet of each stage plotted as a percentage of the group of 100 reaction stages from the reactant feed inlet (0) to the product outlet (100). It is seen that the temperature of the reactant gas is within the desired control range of 850 to 900° C. through the first 90 stages. The temperature of the reactant gas rises above 900° C. in the last 10 stages and exits the last stage at 900° C. The saw-tooth temperature profile is attributed to the exothermic partial and complete oxidation reactions occurring in each stage followed by net endothermic equilibration of the steam reforming, carbon dioxide reforming, and water-gas shift reactions in each adiabatic catalyst bed following the stage.

TABLE 4

Simulation Summary for Example 2

| | Pre-Ref'r Feed | ITM Reactor Feed | Total $O_2$ Permeate | Reactant Gas at Outlet of Reactor Stage No. | | | | | | | | | | |
|---|---|---|---|---|---|---|---|---|---|---|---|---|---|---|
| | | | | 1 | 10 | 20 | 30 | 40 | 50 | 60 | 70 | 80 | 90 | 100 |
| Temp., ° C. | 510 | 474 | | 858 | 860 | 867 | 872 | 875 | 877 | 879 | 881 | 882 | 883 | 900 |
| Press., bara | 33.3 | 32.7 | | 30.3 | 30.3 | 30.3 | 30.3 | 30.3 | 30.3 | 30.3 | 30.3 | 30.3 | 30.3 | 30.3 |
| Flow, kgmol/hr | 3313 | 3463 | 1000 | 2294.7 | 2968.2 | 3686.4 | 4407.3 | 5134.6 | 5868.0 | 6607.7 | 7351.5 | 8100.1 | 8851.7 | 9413.1 |
| $H_2$, mol % | 2.02 | 7.31 | | 2.82 | 20.16 | 29.77 | 35.35 | 38.88 | 41.25 | 42.92 | 44.14 | 45.06 | 45.76 | 46.65 |
| $CH_4$, mol % | 61.08 | 61.91 | | 0.00 | 0.03 | 0.23 | 0.63 | 1.13 | 1.66 | 2.19 | 2.68 | 3.14 | 3.56 | 2.97 |
| $CO_2$, mol % | 0.46 | 2.50 | | 0.91 | 5.47 | 7.05 | 7.53 | 7.60 | 7.52 | 7.38 | 7.23 | 7.07 | 6.93 | 6.69 |
| CO, mol % | | 0.11 | | 0.03 | 1.79 | 4.32 | 6.52 | 8.28 | 9.70 | 10.84 | 11.76 | 12.53 | 13.17 | 14.08 |
| $H_2O$, mol % | 33.50 | 27.80 | | 96.23 | 72.51 | 58.56 | 49.89 | 44.00 | 39.76 | 36.56 | 34.07 | 32.08 | 30.46 | 29.47 |
| $N_2$, mol % | 0.37 | 0.36 | | 0.01 | 0.04 | 0.06 | 0.08 | 0.09 | 0.10 | 0.11 | 0.12 | 0.13 | 0.13 | 0.13 |
| $O_2$, mol % | | | 100 | | | | | | | | | | | |
| $C_2H_6$, mol % | 2.04 | | | | | | | | | | | | | |
| $C_3H_8$, mol % | 0.35 | | | | | | | | | | | | | |
| $C_4H_{10}$, mol % | 0.12 | | | | | | | | | | | | | |
| $C_5H_{12}$, mol % | 0.04 | | | | | | | | | | | | | |
| $C_6H_{14}$, mol % | 0.03 | | | | | | | | | | | | | |

Example 3

Operation of the system of Example 3 was simulated using the same simulation method and the same specific process features and parameters as in Example 1. 1505.3 kgmol/hr natural gas, 47.3 kgmol/hr hydrogen, and 782.2 kgmol/hr steam are mixed and preheated to 510° C. The heated mixture is pre-reformed in an adiabatic pre-reformer reactor and exits the adiabatic pre-reformer reactor at 474° C. A stream of recycled offgas from a Fischer-Tropsch synthesis reactor at 2631.5 kgmol/hr and 38° C. having a composition of 38.1% hydrogen, 11.7% methane, 28.8% carbon dioxide, 19.10% carbon monoxide, 0.3% water, and 2.0% nitrogen is mixed with the pre-reformed reactant gas. The resulting mixed reactant feed gas at 282° C. is divided and distributed to the 100 ITM stages for temperature control, and the amount of recycle gas is used to control the $H_2$/CO ratio in the synthesis gas product from the reactor system. The mixed reactant feed gas is divided into portions as given in Table 5.

Each portion in Table 5 is divided into ten equal sub-portions. 1564.5 kgmol/hr of steam is preheated to 875° C., mixed with the first sub-portion of portion 1, and the mixture is introduced to the reactant side of the first stage. The other 99 sub-portions (all of the sub-portions except the first sub-portion of portion 1) are provided as reactant interstage feed gas streams, each of which is mixed with a respective interstage reactant gas stream and fed to the inlet of each of the respective 99 stages. Air is provided to the oxidant side of each stage at 855° C. and oxygen-depleted air is withdrawn from the oxidant side of each stage.

Sufficient catalyst is provided in this Example on the reactant sides of all membrane modules such that the steam reforming, carbon dioxide reforming, and water-gas shift reactions occur within the modules and maintain essentially chemical equilibrium conditions throughout the 100-stage reactor system. A final synthesis gas product is withdrawn from stage 100 at 900° C. and 9702.2 kgmol/hr with a composition of 40.3% hydrogen, 3.0% methane, 9.8% carbon dioxide, 19.7% carbon monoxide, 26.7% water, and 0.6% nitrogen (compositions in mole %).

Figure 8:
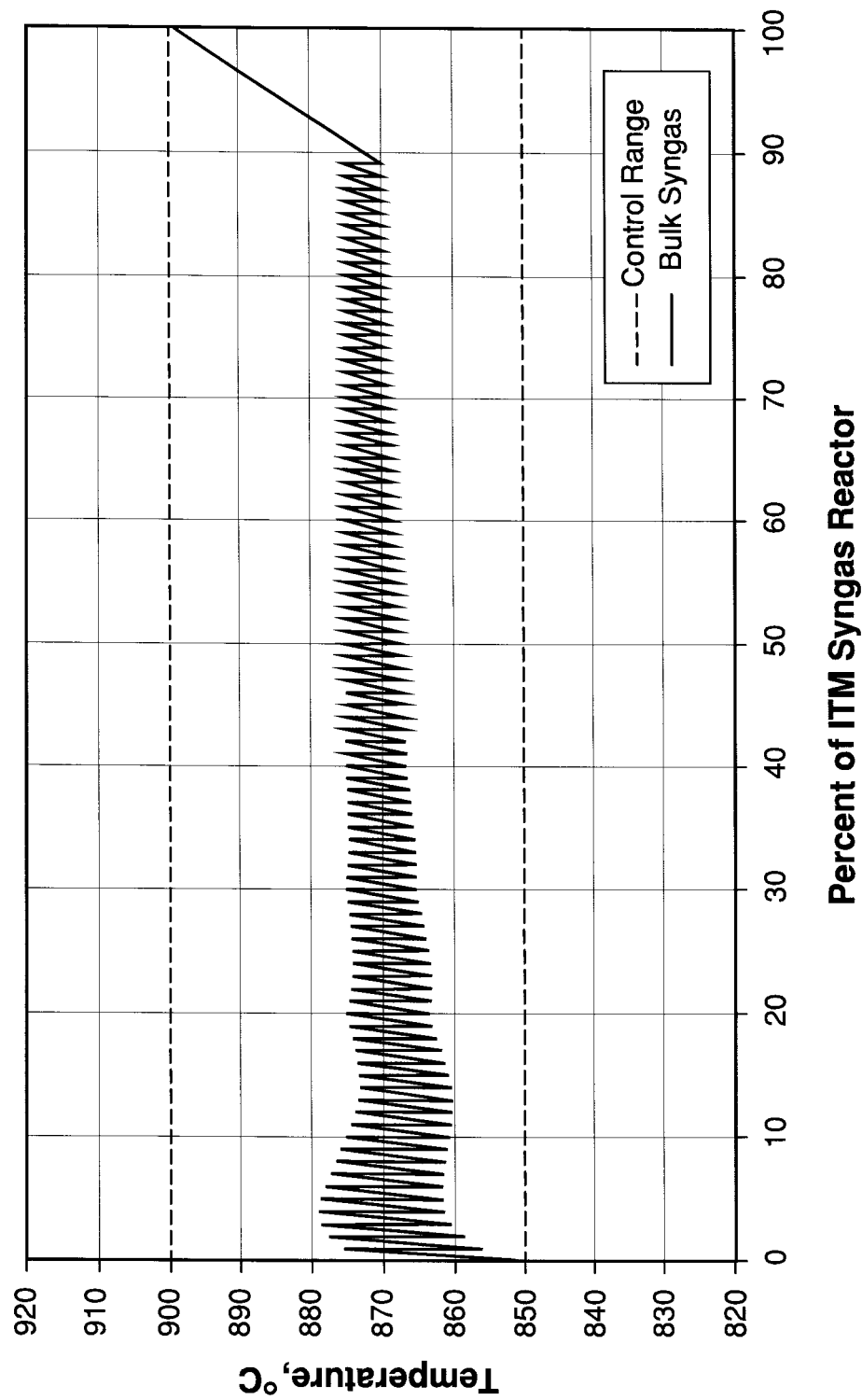
FIG. 8 is a plot of the temperature of the reactant gas as a percentage of a group of 100 reaction stages from the reactant feed inlet (0) to the product outlet (100) for Example 3.

A summary of the simulation results is given in Table 6 showing the reactant gas temperature and composition from the first reactor stage and from each succeeding group of 10 stages. FIG. 8 shows the temperature of the reactant gas at the inlet and outlet of each stage plotted as a percentage of the group of 100 reaction stages from the reactant feed inlet (0) to the product outlet (100). It is seen that staged operation of the reactor system controls the reactant gas temperature within the preferred membrane temperature range of 850 to 900° C. The temperature of the reactant gas rises from nominally 870 to 900° C. in the last 10 stages. The saw-tooth temperature profile is attributed to quenching of the interstage reactant gas upon introduction of cold mixed reactant feed gas (i.e., pre-reformed feed gas plus recycle gas) into the interstage reactant gas between each of the 100 stages.

TABLE 5

Mixed Reactant Feed Gas Distribution for Example 3

| Distribution of Mixed Reactant Feed Gas to Stage Groups | Portion | Flow to Stage Group | |
|---|---|---|---|
| | | (kgmol/hr) | (%) |
| Stages 1 through 10 | 1 | 492.9 | 9.7 |
| Stages 11 through 20 | 2 | 497.1 | 9.8 |
| Stages 21 through 30 | 3 | 522.0 | 10.3 |
| Stages 31 through 40 | 4 | 543.4 | 10.7 |
| Stages 41 through 50 | 5 | 558.6 | 11.0 |
| Stages 51 through 60 | 6 | 569.0 | 11.2 |
| Stages 61 through 70 | 7 | 576.4 | 11.4 |
| Stages 71 through 80 | 8 | 581.6 | 11.5 |
| Stages 81 through 90 | 9 | 585.5 | 11.5 |
| Stages 91 through 100 | 10 | 145.9 | 2.9 |
| Total to all stages | | 5072.5 | 100.0 |

TABLE 6

Simulation Summary for Example 3

| | Pre-Ref'r Feed | ITM Reactor Feed | Total $O_2$ Permeate | Reactant Gas at Outlet of Reactor Stage No. | | | | | | | | | | |
|---|---|---|---|---|---|---|---|---|---|---|---|---|---|---|
| | | | | 1 | 10 | 20 | 30 | 40 | 50 | 60 | 70 | 80 | 90 | 100 |
| Temp., ° C. | 510 | 282 | | 875 | 875 | 875 | 875 | 875 | 875 | 875 | 875 | 875 | 875 | 900 |
| Press., bara | 33.3 | 32.7 | | 30.3 | 30.3 | 30.3 | 30.3 | 30.3 | 30.3 | 30.3 | 30.3 | 30.3 | 30.3 | 30.3 |
| Flow, kgmol/hr | 2335 | 5073 | 1000 | 1649.1 | 2407.0 | 3230.6 | 4065.1 | 4912.1 | 5768.5 | 6631.6 | 7499.4 | 8370.6 | 9244.4 | 9702.2 |
| $H_2$, mol % | 2.02 | 23.28 | | 3.98 | 23.58 | 31.50 | 35.07 | 36.90 | 37.92 | 38.53 | 38.90 | 39.15 | 39.31 | 40.30 |
| $CH_4$, mol % | 61.08 | 35.86 | | 0.00 | 0.08 | 0.53 | 1.18 | 1.85 | 2.47 | 3.01 | 3.47 | 3.87 | 4.22 | 2.95 |
| $CO_2$, mol % | 0.46 | 16.15 | | 1.76 | 8.64 | 10.31 | 10.69 | 10.74 | 10.67 | 10.58 | 10.48 | 10.39 | 10.30 | 9.79 |
| CO, mol % | | 9.96 | | 0.09 | 3.96 | 8.16 | 11.18 | 13.34 | 14.94 | 16.16 | 17.11 | 17.88 | 18.50 | 19.66 |
| $H_2O$, mol % | 33.5 | 13.54 | | 94.13 | 63.48 | 49.13 | 41.43 | 36.67 | 33.45 | 31.15 | 29.42 | 28.09 | 27.02 | 26.67 |
| $N_2$, mol % | 0.37 | 1.21 | | 0.04 | 0.25 | 0.37 | 0.45 | 0.51 | 0.55 | 0.58 | 0.61 | 0.63 | 0.64 | 0.63 |
| $O_2$, mol % | | | 100 | | | | | | | | | | | |
| $C_2H_6$, mol % | 2.04 | | | | | | | | | | | | | |
| $C_3H_8$, mol % | 0.35 | | | | | | | | | | | | | |
| $C_4H_{10}$, mol % | 0.12 | | | | | | | | | | | | | |
| $C_5H_{12}$, mol % | 0.04 | | | | | | | | | | | | | |
| $C_6H_{14}$, mol % | 0.03 | | | | | | | | | | | | | |

Example 4

Consider an ITM oxidation reactor system with membranes having a composition that exhibits the $p_{CO2}*$ behavior characterized by FIG. 5. The oxidation system is integrated with a Fischer-Tropsch (F-T) process wherein the F-T offgas is recycled to the ITM reactor system to adjust the synthesis gas product $H_2$/CO molar ratio to about 2:1. In this example, a single stage reactor system operates at 30 bara and 800° C. Sufficient catalyst is provided in this Example on the reactant sides of all membrane modules such that the steam reforming, carbon dioxide reforming, and water-gas shift reactions occur within the modules and maintain essentially chemical equilibrium conditions throughout the reactor system. The F-T offgas is mixed with natural gas feed and the combined feed is mixed with steam before being partially reformed in a pre-reformer. This pre-reformed gas provides reactant feed gas to the single stage ITM reactor system. The reactor inlet gas composition is 5.5% $H_2$, 0.4% CO, 16.3% $CO_2$, 46.6% $H_2O$, 30% $CH_4$, and 1.3% $N_2$ (compositions in mole %). At these feed conditions, the equilibrium partial pressure of oxygen is $2.5 \times 10^{-19}$ bara and $p_{CO2}*$ is 1.7 bara (from FIG. 5). However, the actual equilibrium value of $p_{CO2}$ is 3.2 bara, well above $p_{CO2}*$, indicating that decomposition of the reactor membranes would occur.

Example 5

The ITM oxidation reactor system of FIG. 4 is operated with two stages 401 and 403, and stages 405-407 and manifold 439 are not used. Sufficient catalyst is provided in this Example on the reactant sides of all membrane modules such that the steam reforming, carbon dioxide reforming, and water-gas shift reactions occur within the modules and maintain essentially chemical equilibrium conditions throughout the reactor system. Pre-reformed natural gas in line 427 is mixed with steam via line 429 and the mixture flows via line 430 into first reactor stage 401. The reactant stream is partially converted in stage 401 and reaches equilibrium at the upper operating temperature limit of 900° C. at the outlet of stage 401. F-T offgas via line 431 is preheated in heat exchanger 435 and is reformed in pre-reformer 437 to convert heavier hydrocarbons in the F-T offgas. Steam is added via line 433. The pre-reformed gas at 560° C. flows via lines 441 and 453 (heater 447 is not used) and is mixed with the interstage reactant gas in line 401e. The mixed gas flows via line 402 into second reactor stage 403. Selected operating conditions and gas compositions are given in Table 7.

TABLE 7

Operating Conditions for Example 5

|  | Pre-reformed feed (line 430) | Interstage feed to stage 403 (line 402) |
| --- | --- | --- |
| Pressure (bara) | 30 | 26 |
| Temperature (° C.) | 800 | 783 |
| $H_2$ (mol %) | 8.0 | 36.1 |
| CO (mol %) | 0.1 | 11.4 |
| $CO_2$ (mol %) | 3.2 | 16.4 |
| $H_2O$ (mol %) | 52.6 | 28.8 |
| $CH_4$ (mol %) | 35.7 | 6.3 |
| $N_2$ (mol %) | 0.4 | 1.1 |

The equilibrium partial pressure of oxygen at the conditions in line 430 is $1.5 \times 10^{-19}$ bara, $p_{CO2}*$ is 1.65 bara (from FIG. 5), and the actual equilibrium value of $p_{CO2}$ is 1.61 bara. Thus, the membranes are essentially at the limit of decomposition stability via $CO_2$ reaction at the inlet to stage 401. In line 402 at the inlet to second stage 403, the equilibrium partial pressure of oxygen is $1.9 \times 10^{-19}$ bara and $p_{CO2}*$ is 1.5 bara (from FIG. 5). The actual equilibrium value of $p_{CO2}$, however, is 3.9 bara, indicating that decomposition of the membranes in stage 403 would occur.

Example 6

The ITM oxidation reactor system of FIG. 4 is operated with three stages 401, 403, and 405. Stage 407 is not used. Sufficient catalyst is provided in this Example on the reactant sides of all membrane modules such that the steam reforming, carbon dioxide reforming, and water-gas shift reactions occur within the modules and maintain essentially chemical equilibrium conditions throughout the reactor system. Pre-reformed natural gas in line 427 is mixed with steam via line 429 and the mixture flows via line 430 into first reactor stage 401. The reactant stream is partially converted in stage 401 and reaches equilibrium at the upper operating temperature limit of 900° C. at the outlet of stage 401. F-T offgas via line 431 is preheated in heat exchanger 435 and is reformed in pre-reformer 437 to convert heavier hydrocarbons in the F-T offgas. Steam is added via line 433. Half of the pre-reformed offgas at 560° C. flows via lines 441 and 453 (heater 447 is not used) and is mixed with the interstage reactant gas in line 401e. The mixed gas flows via line 402 into second reactor stage 403, the reactant stream is partially converted therein, and the stream reaches equilibrium at the upper operating temperature limit of 900° C. at the outlet of stage 403. The other half of the pre-reformed offgas at 560° C. flows via lines 443 and 455 (heater 449 is not used) and is mixed with the interstage reactant gas in line 403e. The mixed interstage gas flows via line 404 into third reactor stage 405.

Selected operating conditions and gas compositions are given in Table 8.

TABLE 8

Operating Conditions for Example 6

|  | Pre-reformed feed (line 430) | Interstage feed to stage 403 (line 402) |
| --- | --- | --- |
| Pressure (bara) | 30 | 28 |
| Temperature (° C.) | 800 | 829 |
| $H_2$ (mol %) | 8.0 | 41.1 |
| CO (mol %) | 0.1 | 12.5 |
| $CO_2$ (mol %) | 3.2 | 12.3 |
| $H_2O$ (mol %) | 52.6 | 28.1 |
| $CH_4$ (mol %) | 35.7 | 5.3 |
| $N_2$ (mol %) | 0.4 | 0.8 |

Conditions at the inlet to first stage 401 are similar to those in Example 5 (above). The equilibrium partial pressure of oxygen is $1.2 \times 10^{-18}$ bara in line 402 at the inlet to stage 403 and $p_{CO2}*$ is 2.9 bara (from FIG. 5). Since the actual equilibrium value of $p_{CO2}$ is 3.0 bara, however, decomposition of the membranes in stage 403 would occur.

Example 7

The ITM oxidation reactor system of FIG. 4 is operated with four stages 401, 403, 405, and 407. Sufficient catalyst is provided in this Example on the reactant sides of all membrane modules such that the steam reforming, carbon dioxide reforming, and water-gas shift reactions occur within the modules and maintain essentially chemical equilibrium conditions throughout the reactor system. Pre-reformed natural gas in line 427 is mixed with steam via line 429 and the mixture flows via line 430 into first reactor stage 401. The reactant stream is partially converted in stage 401 and reaches equilibrium at the upper operating temperature limit of 900° C. at the outlet of stage 401. F-T offgas via line 431 is preheated in heat exchanger 435 and is reformed in pre-reformer 437 to convert heavier hydrocarbons in the F-T offgas. Steam is added via line 433.

One-third of the pre-reformed offgas at 560° C. flows via lines 441 and 453 (heater 447 is not used) and is mixed with the interstage reactant gas in line 401e. The mixed gas flows via line 402 into second reactor stage 403, the reactant stream is partially converted therein, and the stream reaches equilibrium at the upper operating temperature limit of 900° C. at the outlet of stage 403. Another one-third of the pre-reformed offgas at 560° C. flows via lines 443 and 455 (heater 449 is not used) and is mixed with the interstage reactant gas in line 403e. The mixed interstage gas flows via line 404 into third reactor stage 405, the reactant stream is partially converted therein, and the stream reaches equilibrium at the upper operating temperature limit of 900° C. at the outlet of stage 405.

The remaining one-third of the pre-reformed offgas at 560° C. flows via lines 445 and 457 (heater 451 is not used) and is mixed with the interstage reactant gas in line 405e. The mixed interstage gas flows via line 406 into fourth reactor stage 407, the reactant stream is partially converted therein, and the stream reaches equilibrium at the upper operating temperature limit of 900° C. at the outlet of stage 407.

Selected operating conditions and gas compositions are given in Table 9.

TABLE 9

Operating Conditions for Example 7

|  | Pre-reformed feed (line 430) | Interstage feed to stage 403 (line 402) | Interstage feed to stage 405 (line 404) | Interstage feed to stage 407 (line 406) |
|---|---|---|---|---|
| Pressure (bara) | 30 | 28 | 28 | 27 |
| Temperature (° C.) | 800 | 849 | 856 | 862 |
| $H_2$ (mol %) | 8.0 | 43.1 | 39.4 | 36.6 |
| CO (mol %) | 0.1 | 13.1 | 14.9 | 16.0 |
| $CO_2$ (mol %) | 3.2 | 10.6 | 11.9 | 13.0 |
| $H_2O$ (mol %) | 52.6 | 27.9 | 29.3 | 30.3 |
| $CH_4$ (mol %) | 35.7 | 4.7 | 3.7 | 3.0 |
| $N_2$ (mol %) | 0.4 | 0.6 | 0.9 | 1.1 |

Conditions at the inlet to first stage 401 are similar to those in Example 5 (above). In the interstage reactant gas in line 402, the equilibrium partial pressure of oxygen is $2.7 \times 10^{-18}$ bara, $p_{CO2}*$ is 3.7 bara, and the actual equilibrium value of $p_{CO2}$ is only 2.6 bara. In the interstage reactant gas in line 404, the equilibrium partial pressure of oxygen is $4.3 \times 10^{-18}$ bara, $p_{CO2}*$ is 4.3 bara, and the actual equilibrium value of $p_{CO2}$ is only 3.0 bara. Finally, in the interstage reactant gas in line 406, the equilibrium partial pressure of oxygen is $7.9 \times 10^{-18}$ bara, $p_{CO2}*$ is 5.2 bara, and the actual equilibrium value of $p_{CO2}$ is only 3.4 bara.

It is seen from these results that $p_{CO2}*$ remains below $p_{CO2}*$ at all locations in the reactor system. Thus, multiple stages, in this example four stages with three interstage injection points, enable the injection of this particular $CO_2$-containing pre-reformed F-T offgas while maintaining $p_{CO2} < p_{CO2}*$ throughout the ITM reactor system.

Example 8

For membranes with compositions having less robust $p_{CO2}*$ behavior than shown in FIG. 5, the stream of pre-reformed F-T offgas can be divided and injected at a greater number of interstage injection points to mitigate temperature depression and corresponding decrease in $p_{CO2}*$ at each injection point. Alternatively, the pre-reformed F-T offgas streams can be heated before injection, for example by heaters 447, 449, and 451 of FIG. 4 or in a common heater (not shown) downstream of pre-reformer 437. The number of stages and the heating of the intermediate pre-reformed F-T offgas streams may be selected to optimize the membrane reactor operation and equipment cost for specific feed gas compositions and product synthesis gas $H_2$/CO ratio requirements.

As an example, if the F-T off-gas recycle stream in line 441 of FIG. 4 in Example 6 were heated from 560° C. to 650° C. in heater 447, the combined stream in line 402 would be at 847° C. At this temperature, the equilibrium partial pressure of oxygen would be $2.6 \times 10^{-18}$ bara, $p_{CO2}*$ would be 3.7 bara, and the actual equilibrium value of $p_{CO2}$ would be only 2.9 bara. If the F-T off-gas recycle stream in line 443 of Example 6 were heated from 560° C. to 650° C. in heater 449, the combined stream in line 404 would be at 857° C. At this temperature, the equilibrium partial pressure of oxygen would be $5.0 \times 10^{-18}$ bara, $p_{CO2}*$ would be 4.5 bara, and the actual equilibrium value of $p_{CO2}$ would be only 3.3 bara. Thus the use of two intermediate injection points and a three-stage reactor system would maintain $p_{CO2} < p_{CO2}*$ throughout the ITM reactor system. The choice of reheating versus additional reactor stages would depend on the cost tradeoff between high temperature heat exchanger tubing for the reheat duty and the cost of providing stages required for the injection and mixing points.

The invention claimed is:

1. A method for the operation of an ion transport membrane oxidation system comprising
   (a) introducing one or more reactant gases into a reactant zone of the ion transport membrane oxidation system, wherein the one or more reactant gases comprise at least methane and carbon dioxide;
   (b) introducing an oxygen-containing gas into an oxidant zone of the ion transport membrane oxidation system;
   (c) permeating oxygen from the oxidant zone through an ion transport membrane into the reactant zone and reacting the oxygen therein with one or more components in the reactant gases; and
   (d) maintaining the partial pressure of carbon dioxide in the reactant gas flowing into the reactant zone to be less than a critical threshold carbon dioxide partial pressure, $p_{CO2}*$, wherein $p_{CO2}*$ is defined as a carbon dioxide partial pressure above which the material in the ion transport membrane reacts with carbon dioxide and decomposes.

2. The method of claim 1 wherein the ion transport membrane oxidation system comprises multiple reactor stages each comprising an ion transport membrane, the reactant conversion in each stage is controlled, the amount of oxygen permeated through the ion transport membrane in each stage is kept sufficiently low to prevent an excessive oxygen vacancy gradient in the ion transport membrane in each stage, and where the partial pressure of carbon dioxide in contact with the ion transport membrane in each stage is maintained below the critical partial pressure.

3. The method of claim 1 wherein the ion transport membrane oxidation system is a reactant-staged membrane oxidation reactor system.

4. The method of claim 3 wherein the reactant-staged membrane oxidation reactor system has interstage introduction of carbon dioxide wherein the interstage introduction of carbon dioxide is controlled so that the partial pressure of carbon dioxide remains less than $p_{CO2}*$ in all stages of the reactant-staged membrane oxidation reactor system.

5. The method of claim 1 wherein the total desired reactant conversion in the ion transport membrane oxidation system is achieved by utilizing a plurality of reactor stages in series wherein each stage is operated so that the degree of reactant conversion in each stage is controlled at a selected value, and wherein portions of the one or more reactant gases are introduced into two or more stages of the ion transport membrane oxidation system.

6. The method of claim 5 wherein the one or more reactant gases comprise recycle gas from downstream synthesis conversion processes wherein the recycle gas is introduced to increase overall reactant gas conversion, the recycle gas providing the carbon dioxide in the one or more reactant gases.

7. The method of claim 6 wherein the one or more reactant gases comprise recycle gas from downstream synthesis conversion processes to also control temperatures in selected stages of the ion transport membrane oxidation system.

8. The method of claim 5 wherein the one or more reactant gases comprise recycle gas from downstream synthesis conversion processes to control temperatures in selected stages of the ion transport membrane oxidation system, the recycle gas providing the carbon dioxide in the one or more reactant gases.

* * * * *